(12) United States Patent
Liu et al.

(10) Patent No.: US 10,383,049 B2
(45) Date of Patent: Aug. 13, 2019

(54) COMMUNICATIONS METHOD, DEVICE, AND SYSTEM

(71) Applicant: China Academy of Telecommunications Technology, Beijing (CN)

(72) Inventors: Jiamin Liu, Beijing (CN); Fei Qin, Beijing (CN); Yuan He, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 217 days.

(21) Appl. No.: 15/518,238

(22) PCT Filed: Sep. 29, 2015

(86) PCT No.: PCT/CN2015/091058
§ 371 (c)(1),
(2) Date: Apr. 10, 2017

(87) PCT Pub. No.: WO2016/054984
PCT Pub. Date: Apr. 14, 2016

(65) Prior Publication Data
US 2017/0311251 A1    Oct. 26, 2017

(30) Foreign Application Priority Data
Oct. 11, 2014 (CN) .......................... 2014 1 0536365

(51) Int. Cl.
*H04W 48/20* (2009.01)
*H04W 8/02* (2009.01)
(Continued)

(52) U.S. Cl.
CPC ............. *H04W 48/20* (2013.01); *H04W 8/02* (2013.01); *H04W 8/26* (2013.01);
(Continued)

(58) Field of Classification Search
CPC ................................ H04W 28/20; H04W 8/02
See application file for complete search history.

(56) References Cited

U.S. PATENT DOCUMENTS

| | | | | |
|---|---|---|---|---|
| 2014/0120922 A1* | 5/2014 | Morioka | ............... | H04W 76/15 455/446 |
| 2014/0155078 A1* | 6/2014 | Balageas | ............... | H04W 24/02 455/452.1 |
| 2016/0338082 A1* | 11/2016 | Yi | ......................... | H04W 76/14 |

FOREIGN PATENT DOCUMENTS

| | | |
|---|---|---|
| CN | 103733652 A | 4/2014 |
| CN | 103888959 A | 6/2014 |
| WO | 2014103098 A1 | 7/2014 |

* cited by examiner

*Primary Examiner* — Zhensheng Zhang
(74) *Attorney, Agent, or Firm* — Kilpatrick Townsend & Stockton LLP

(57) ABSTRACT

A communications method, device, and system for solving the connection and communications efficiency problem due to the presence of a large number of cells. The method comprises: a first local controller determines that a user equipment needs to establish a data bearer; data bearer configuration information for transmitting user data is generated; the data bearer configuration information is transmitted to a first local gateway and/or at least a first small base station, so that the network element entity that has received the data bearer configuration information establishes a data transmission channel according to the data bearer configuration information, the user equipment belonging to the first local controller and the first local gateway, the first small base station providing services to the user equipment.

17 Claims, 9 Drawing Sheets

(51) Int. Cl.
*H04W 8/26* (2009.01)
*H04W 36/00* (2009.01)
*H04W 88/12* (2009.01)
*H04W 76/11* (2018.01)
*H04W 24/02* (2009.01)
*H04W 68/12* (2009.01)

(52) U.S. Cl.
CPC ....... *H04W 36/0083* (2013.01); *H04W 88/12* (2013.01); *H04W 24/02* (2013.01); *H04W 36/0094* (2013.01); *H04W 68/12* (2013.01); *H04W 76/11* (2018.02)

COMMUNICATIONS METHOD, DEVICE, AND SYSTEM

This application is a U.S. National Stage of International Application No. PCT/CN2015/091058, filed on Sep. 29, 2015, designating the United States, and claiming priority to Chinese Patent Application No. 201410536365.6, filed with the Chinese Patent Office on Oct. 11, 2014, and entitled "A communication method, device, and system", which is hereby incorporated by reference in its entirety.

FIELD

The present invention relates to the field of communications, and particularly to a communication method, device, and system.

BACKGROUND

In the future development of mobile communication systems, it will be necessary to introduce more access nodes in order to better satisfy demands of users, and to greatly improve the capacity and the throughput of a network, so that the network will become ultra-dense in the future. As there are more access nodes, there is a need of an effective communication solution to better provision of high-rate data transmission services for the users, and to better management of the large number of access points.

In view of the need above, such a dual-connectivity architecture has been proposed in the study of small cell enhancement that is as illustrated in the schematic structural diagram in FIG. 1, where user equipment maintain its connection with the small base station in addition to its maintained connection with a macro base station, so that the user equipment transmits data wirelessly over resources of the two base stations.

Although some of the user equipments can be connected with the small base stations in the dual-connectivity architecture above, the dual-connectivity architecture still relies upon the existing macro base station, so if there are a large number of small base stations, then both the communication efficiency, and the experiences of the user equipments will be restricted by the architecture, and consequently can not be optimized. For example, only a user equipment capable of operating at two frequencies can access a high-rate data transmission service, that is, the capability of the user equipment shall be qualified, a macro base station can only manage those small base stations in its coverage area, etc., thus restricting the communication efficiency, and the experiences of the user equipments, so it is desirable to propose a new architecture and communication method so as to address the issues of the connections and the communication efficiency in the case of a large number of small base stations.

SUMMARY

Embodiments of the invention provide a communication method, device, and system so as to address the issues of the connections and the communication efficiency in the case of a large number of small base stations.

The embodiments of the invention provide a communication method, device, and system particularly as follows:

In a first aspect, a communication method includes:
determining, by a first local controller, that there is a user equipment for which a data bearer needs to be established;
generating, by the first local controller, data bearer configuration information for transmitting the user data; and
sending, by the first local controller, the data bearer configuration information to a first local gateway and/or at least one first small base station, so that the network element entity receiving the data bearer configuration information establishes a data transmission channel according to the data bearer configuration information, wherein the user equipment is hosted by the first local controller and the first local gateway, and the first small base station serves the user equipment.

With this possible implementation, the first local controller sends the data bearer configuration information to the first local gateway and/or the at least one first small base station, so that the first local gateway establishes the data transmission channel according to the received data bearer configuration information, and further transmits user data, and the first small base station establishes the data transmission channel according to the received data bearer configuration information, and further transmits user data, so the first local controller directly manages the first small station centrally, and controls the first small base station and the first local gateway centrally to establish a data transmission channel, so that when the user equipment needs to transmit user data, then a data transmission channel will be established without involving any macro base station, and there will be no capability of the user equipment to be qualified, thus addressing the issues of the connections and the communication efficiency in the case of a large number of small base stations.

In connection with the first aspect, in a first possible implementation, the method further includes:
sending, by the first local controller, broadcast channel configuration information to the first small base station, so that the first small base station issues common control signaling according to the broadcast channel configuration information.

In connection with the first aspect, in a second possible implementation, the method further includes:
when the user equipment residing on a macro base station is switched from an idle state to a connected state, and needs to transmit user data through the first small base station, then interacting, by the first local controller, with the macro base station, and obtaining small base station configuration information for carrying the user data of the user equipment; and
sending, by the first local controller, control signaling including the small base station configuration information to the first small base station, so that the first small base station provides the user equipment with a data transmission service according to the small base station configuration information.

In connection with the first aspect, in a third possible implementation, the method further includes:
configuring, by the first local controller, the first small base station with protocol stack configuration information according to a network condition, and a performance of a backhaul link between the first small base station and the first local gateway; or
sending, by the first local controller, the data bearer configuration information to the first local gateway includes:
carrying, by the first local controller, the protocol stack configuration information configured for the first small base station, in the data bearer configuration information, and sending the data bearer configuration information to the first local gateway, so that the first local gateway processes user data received from the first small base station according to the protocol stack configuration information of the first small base station; or sending, by the first local controller, the data bearer configuration information to the at least one first small base station includes:

carrying, by the first local controller, the protocol stack configuration information configured for the first small base station, in the data bearer configuration information, and sending the data bearer configuration information to the first small base station, so that the first small base station processes user data according to the received protocol stack configuration information; or sending, by the first local controller, the data bearer configuration information to the first local gateway and the at least one first small base station includes:

carrying, by the first local controller, the protocol stack configuration information configured for the respective first small base stations, in the data bearer configuration information, and sending the data bearer configuration information to the first local gateway, and carrying the protocol stack configuration information configured for the first small base stations, in the data bearer configuration information, and sending the data bearer configuration information to the first small base station, so that the first small base stations process user data according to the received protocol stack configuration information, and the first local gateway processes user data received from the first small base stations according to the protocol stack configuration information of the first small base stations;

wherein the protocol stack configuration information is configured in any one of the following modes:

in a first mode, the Physical (PHY) layer, the Media Access Control (MAC) layer, the Radio Link Control (RLC) layer, and the Packet Data Convergence Protocol (PDCP) layer are located in the first local gateway;

in a second mode, PHY layer is located in the first small base station, and MAC, RLC, and PDCP layers are located in the first local gateway;

in a third mode, PHY and MAC layers are located in the first small base station, and RLC, and PDCP layers are located in the first local gateway; and in a fourth mode, PHY, MAC and RLC layers are located in the first small base station, and PDCP is located in the first local gateway.

In connection with the first aspect, in a fourth possible implementation, the method further includes:

receiving, by the first local controller, a link quality measurement report; and upon determining, by the first local controller, that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment, then sending control signaling including reconfiguration information to the user equipment through the at least one first small base station; and sending a switching instruction to the first small base station serving the user equipment, so that the first small base station serving the user equipment stops serving the user equipment, and sending a switching instruction and the reconfiguration information to the second small base station to which the user equipment needs to be switched, so that the second small base station to which the user equipment needs to be switched starts to serve the user equipment;

wherein the link quality measurement report includes either or both of the following instances:

a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment; and the reconfiguration information is determined by the first local controller according to the configuration information of the user equipment in the second small base station.

In connection with the first aspect, in a fifth possible implementation, the method further includes:

receiving, by the first local controller, a link quality measurement report;

sending, by the first local controller, switching request signaling to a second local controller upon determining that that the user equipment needs to be switched to at least one third small base station hosted by the second local controller, according to the received link quality measurement report;

receiving, by the first local controller, switching acknowledgment signaling, including configuration information configured for the user equipment, sent by the second local controller; and sending, by the first local controller, the received switching acknowledgment signaling including the configuration information configured for the user equipment to the user equipment through the at least one first small base station;

wherein the link quality measurement report includes either or both of the following instances:

a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment.

In connection with the first aspect, in a sixth possible implementation, when the user equipment transmitting the user data is switched from the first small base station to a second small base station hosted by the first local controller and the first local gateway, then the method further includes:

sending, by the first local controller, first data forwarding control signaling to the first small base station, so that when there is no direct data channel established between the first small base station and the second small base station, then forwarding first forwarded data to the first local gateway, so that the first local gateway forwards the first forwarded data to the second small base station, and when there is a direct data channel established between the first small base station and the second small base station, then forwarding first forwarded data to the second small base station over the direct data channel; or when the user equipment transmitting the user data is switched from the first small base station to a third small base station hosted by a second local controller and a second local gateway, then the method further includes:

sending, by the first local controller, second data forwarding control signaling to the first small base station, so that if there is no direct data channel established between the first small base station and the third small base station, then forwarding first forwarded data to the first local gateway, so that the first local gateway forwards the first forwarded data to the third small base station through the second local gateway, and when there is a direct data channel established between the first small base station and the third small base station, then forwarding first forwarded data to the third small base station over the direct data channel;

wherein the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

In connection with the first aspect, in a seventh possible implementation, when the user equipment transmitting the user data is switched from the first small base station to a third small base station hosted by a second local controller and a second local gateway, then the method further includes:

sending, by the first local controller, third data forwarding control signaling to the first local gateway, so that the first local gateway forwards second forwarded data to the second local gateway, and the second local gateway forwards the second forwarded data to the third small base station;

wherein the second forwarded data are determined by the first local gateway according to a transmission mode of the user data; and the second forwarded data include at least non-transmitted user data buffered in the first local gateway.

In a second aspect, a communication method includes:

receiving, by a first small base station, data bearer configuration information for transmitting user data, from a first local controller;

establishing, by the first small base station, a data transmission channel according to the received data bearer configuration information; and transmitting, by the first small base station, the user data over the established data transmission channel;

wherein the first small base station is hosted by the first local controller.

With this possible implementation, the first local controller sends the data bearer configuration information to the first small base station, so that the first small base station establishes the data transmission channel according to the received data bearer configuration information, and further transmits user data, so the first local controller directly manages the first small station centrally, and controls the first small base station centrally to establish a data transmission channel, so that if the user equipment needs to transmit user data, then a data transmission channel will be established without involving any macro base station, and there will be no capability of the user equipment to be qualified, thus addressing the issues of the connections and the communication efficiency in the case of a large number of small base stations.

In connection with the second aspect, in a first possible implementation, establishing, by the first small base station, the data transmission channel according to the received data bearer configuration information includes:

establishing, by the first small base station, a data transmission channel with the Internet upon determining that user data are to be transmitted directly over the Internet, according to the received data bearer configuration information;

establishing, by the first small base station, a data transmission channel with a first local gateway upon determining that the first local gateway participates in transmission of user data, according to the received data bearer configuration information;

wherein the first small base station is hosted by the first local gateway.

In connection with the second aspect, in a second possible implementation, the method further includes:

receiving, by the first small base station, broadcast channel configuration information sent by the first local controller; and issuing, by the first small base station, common control signaling according to the broadcast channel configuration information, so that the user equipment covered by the first small base station resides on the first small base station according to the common control signaling.

In connection with the second aspect, in a third possible implementation, the method further includes:

receiving, by the first small base station, control signaling, including small base station configuration information, sent by the first local controller, wherein the small base station configuration information is obtained by the first local controller as a result of interacting with a macro base station; and providing, by the first small base station, the user equipment with a data transmission service according to the small base station configuration information, wherein the user equipment is located in an intersection of a coverage area by the macro base station, and a coverage area by the first small base station, and resides on the macro base station when the user equipment is idle.

In connection with the first possible implementation of the second aspect, in a fourth possible implementation, the data bearer configuration information includes protocol stack configuration information of the first small base station; and before the first small base station transmits the user data over the established data transmission channel, the method further includes:

processing, by the first small base station, the user data according to the received protocol stack configuration information; and transmitting, by the first small base station, the user data over the established data transmission channel includes:

transmitting, by the first small base station, the processed user data over the data transmission channel established between the first small base station and the first local gateway;

wherein the protocol stack configuration information of the first small base station is configured for the first small base station by the first local controller according to a network condition, and a performance of a backhaul link between the first small base station and the first local gateway; and the protocol stack configuration information is configured in any one of the following modes:

in a first mode, the Physical (PHY) layer, the Media Access Control (MAC) layer, the Radio Link Control (RLC) layer, and the Packet Data Convergence Protocol (PDCP) layer are located in the first local gateway;

in a second mode, PHY layer is located in the first small base station, and MAC, RLC, and PDCP layers are located in the first local gateway;

in a third mode, PHY and MAC layers are located in the first small base station, and RLC, and PDCP layers are located in the first local gateway; and in a fourth mode, PHY, MAC and RLC layers are located in the first small base station, and PDCP layer is located in the first local gateway.

In connection with the second aspect, in a fifth possible implementation, the method further includes:

sending, by the first small base station, a link quality measurement report to the first local controller;

receiving, by the first small base station, controlling signaling including reconfiguration information, and a switching instruction, from the first local controller;

sending, by the first small base station, the received control signaling including the reconfiguration information to the user equipment, so that the user equipment is switched to a second small base station; and stopping, by the first small base station, serving the user equipment, according to the switching instruction;

wherein the control signaling including the reconfiguration information, and the switching instruction is issued by the first local controller, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment;

the link quality measurement report includes either or both of the following instances:

a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment; and the reconfiguration information is determined by the first local controller according to configuration information of the user equipment in a third small base station.

In connection with the second aspect, in a sixth possible implementation, the method further includes:

sending, by the first small base station, a link quality measurement report to the first local controller;

receiving, by the first small base station, switching acknowledgement signaling, including configuration information configured for the user equipment, from a second local controller through the first local controller;

sending, by the first small base station, the received switching acknowledgement signaling including the reconfiguration information to the user equipment, so that the user equipment is switched to a third small base station; and stopping, by the first small base station, serving the user equipment, according to the switching acknowledgement signaling;

wherein the switching acknowledgement signaling is sent by the second local controller upon reception of a switching request of the first local controller to switch the user equipment to at least one third small base station, and the third small base station is hosted by the second local controller; and the link quality measurement report includes either or both of the following instances:

a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment.

In connection with the second aspect, in a seventh possible implementation, when the user equipment transmitting the user data is switched from the first small base station to a second small base station hosted by the first local controller and a first local gateway, then the method further includes:

after the first small base station receives first data forwarding control signaling of the first local controller, when there is a direct data channel established between the first small base station and the second small base station, then forwarding first forwarded data to the second small base station over the direct data channel; and when there is no direct data channel established between the first small base station and the second small base station, then forwarding first forwarded data to the first local gateway, so that the first local gateway forwards the first forwarded data to the second small base station;

when the user equipment transmitting the user data is switched from the first small base station to a third small base station hosted by a second local controller and a second local gateway, then the method further includes:

after the first small base station receives second data forwarding control signaling of the first local controller, when there is a direct data channel established between the first small base station and the third small base station, then forwarding first forwarded data to the third small base station over the direct data channel; and when there is no direct data channel established between the first small base station and the third small base station, then forwarding the first forwarded data to the first local gateway, so that the first local gateway forwards the first forwarded data to the third small base station through the second local gateway;

wherein the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

In a third aspect, a communication method includes:
receiving, by a first local gateway, data bearer configuration information for transmitting user data, from a first local controller;
establishing, by the first local gateway, a data transmission channel according to the received data bearer configuration information; and
transmitting, by the first local gateway, the user data over the established data transmission channel.

With this possible implementation, the first local controller sends the data bearer configuration information to the first local gateway, so that the first local gateway establishes the data transmission channel according to the received data bearer configuration information, and further transmits user data, so the first local controller directly controls the first local gateway to establish a data transmission channel, so that when the user equipment needs to transmit user data, then a data transmission channel will be established without involving any macro base station, but user data will be transmitted over the data transmission channel established by the first local gateway, thus addressing the issues of the connections and the communication efficiency in the case of a large number of small base stations.

In connection with the third aspect, in a first possible implementation, establishing, by the first local gateway, the data transmission channel according to the received data bearer configuration information includes:
determining, by the first local gateway, at least one first small base station to participate in transmission of user data, according to the received data bearer configuration information; and
establishing, by the first local gateway, the data transmission channel with the determined at least one first small base station;
wherein the first small base station is hosted by the first local gateway and the first local controller.

In connection with the first possible implementation of the third aspect, in a second possible implementation, establishing, by the first local gateway, the data transmission channel according to the received data bearer configuration information further includes:
establishing, by the first local gateway, a data transmission channel with the Internet upon determining that user data are to be transmitted directly over the Internet, according to the received data bearer configuration information;
establishing, by the first local gateway, a data transmission channel with a core network upon determining that the core network participates in transmission of user data, according to the received data bearer configuration information;
establishing, by the first local gateway, a data transmission channel with at least one second small base station upon determining that the at least one second small base station participates in transmission of user data, according to the received data bearer configuration information;
establishing, by the first local gateway, a data transmission channel with a second local gateway upon determining that the second local gateway participates in transmission of user data, according to the received data bearer configuration information, so that the first local gateway transmits user equipment of a first user equipment to a second user equipment through the second local gateway, and receives user data, transmitted by the second user equipment to the first user equipment, through the second local gateway;
wherein the second small base station is hosted by the first local gateway and the first local controller, the first user equipment is hosted by the first local gateway, and the second user equipment is hosted by the second local gateway.

In connection with the second possible implementation of the third aspect, in a third possible implementation, the data bearer configuration information includes protocol stack configuration information of the respective first small base stations; and before the first local gateway transmits the user data over the established data transmission channel, the method further includes:
processing the user data according to the protocol stack configuration information of the first small base station upon reception of the user data of the first small base station; and
transmitting, by the first local gateway, the user data over the established data transmission channel includes:
transmitting, by the first local gateway, the processed user data over the data transmission channel established between the first local gateway and the at least one first small base station;
wherein the protocol stack configuration information of the first small base station is configured for the first small base station by the first local controller according to a network condition, and the performance of a backhaul link between the first small base station and the first local gateway; and
the protocol stack configuration information is configured in any one of the following modes:
in a first mode, the Physical (PHY) layer, the Media Access Control (MAC) layer, the Radio Link Control (RLC) layer, and the Packet Data Convergence Protocol (PDCP) layer are located in the first local gateway;
in a second mode, PHY layer is located in the first small base station, and MAC, RLC, and PDCP are located in the first local gateway;
in a third mode, PHY and MAC layers are located in the first small base station, and RLC, and PDCP layers are located in the first local gateway; and
in a fourth mode, PHY, MAC and RLC layers are located in the first small base station, and PDCP layer is located in the first local gateway.

In connection with the third aspect, in a fourth possible implementation, when the user equipment transmitting the user data is switched from the first small base station to a second small base station hosted by the first local controller and the first local gateway, then the method further includes:
forwarding, by the first local gateway, first forwarded data forwarded by the first small base station to the second small base station; and
when the user equipment transmitting the user data is switched from the first small base station to a third small base station hosted by a second local controller and a second local gateway, then the method further includes:
forwarding, by the first local gateway, first forwarded data forwarded by the first small base station to the second local gateway, so that the second local gateway sends the received first forwarded data to the third small base station;
wherein the first forwarded data are determined by the first small base station according to a transmission mode of the user data; and
the first forwarded data include non-transmitted user data buffered in the first small base station, or non-transmitted user data, and transmitted user data for which no acknowledgement message is received, buffered in the first small base station.

In connection with the third aspect, in a fifth possible implementation, when the user equipment transmitting the user data is switched from the first small base station to a third small base station hosted by a second local controller and a second local gateway, then the method further includes:

receiving, by the first local gateway, third data forwarded control signaling from the first local controller; and forwarding, by the first local gateway, second forwarded data to the second local gateway, so that the second local gateway sends the received second forwarded data to the third small base station;

wherein the second forwarded data are determined by the first local gateway according to a transmission mode of the user data; and the second forwarded data includes at least non-transmitted user data buffered in the first local gateway.

In a fourth aspect, a first local controller includes:

a determining unit configured to determine that there is a user equipment for which a data bearer needs to be established;

a generating unit configured to generate data bearer configuration information for transmitting the user data; and a sending unit configured to send the data bearer configuration information to a first local gateway and/or at least one first small base station, so that the network element entity receiving the data bearer configuration information establishes a data transmission channel according to the data bearer configuration information, wherein the user equipment is hosted by the first local controller and the first local gateway, and the first small base station serves the user equipment.

With this possible implementation, the first local controller sends the data bearer configuration information to the first local gateway and/or the at least one first small base station, so that the first local gateway establishes the data transmission channel according to the received data bearer configuration information, and further transmits user data, and the first small base station establishes the data transmission channel according to the received data bearer configuration information, and further transmits user data, so the first local controller directly manages the first small station centrally, and controls the first small base station and the first local gateway centrally to establish a data transmission channel, so that if the user equipment needs to transmit user data, then a data transmission channel will be established without involving any macro base station, and there will be no capability of the user equipment to be qualified, thus addressing the issues of the connections and the communication efficiency in the case of a large number of small base stations.

In connection with the fourth aspect, in a first possible implementation, the sending unit is further configured to send broadcast channel configuration information to the first small base station, so that the first small base station issues common control signaling according to the broadcast channel configuration information.

In connection with the fourth aspect, in a second possible implementation, the first local controller further includes:

an interacting unit configured, when the user equipment residing on a macro base station is switched from an idle state to a connected state, and needs to transmit user data through the first small base station, for the first local controller to interact with the macro base station, and to obtain small base station configuration information for carrying the user data of the user equipment; and the sending unit is further configured to send control signaling including the small base station configuration information to the first small base station, so that the first small base station provides the user equipment with a data transmission service according to the small base station configuration information.

In connection with the fourth aspect, in a third possible implementation, the first local controller further includes:

a configuring unit configured to configure the first small base station with protocol stack configuration information according to a network condition, and a performance of a backhaul link between the first small base station and the first local gateway; and the sending unit is configured to send the bearer configuration information to the first local gateway by carrying the protocol stack configuration information configured for the first small base station, in the data bearer configuration information, and sending the data bearer configuration information to the first local gateway, so that the first local gateway processes user data received from the first small base station according to the protocol stack configuration information of the first small base station; or to send the bearer configuration information to the first small base station by carrying the protocol stack configuration information configured for the first small base station, in the data bearer configuration information, and sending the data bearer configuration information to the first small base station, so that the first small base station processes user data according to the received protocol stack configuration information; or to send the bearer configuration information to the first local gateway and the at least one first small base station by carrying the protocol stack configuration information configured for the respective first small base stations, in the data bearer configuration information, and sending the data bearer configuration information to the first local gateway, and carrying the protocol stack configuration information configured for the first small base stations, in the data bearer configuration information, and sending the data bearer configuration information to the first small base stations, so that the first small base stations process user data according to the received protocol stack configuration information, and the first local gateway processes user data received from the first small base stations according to the protocol stack configuration information of the first small base stations; and the protocol stack configuration information is configured in any one of the following modes:

in a first mode, the Physical (PHY) layer, the Media Access Control (MAC) layer, the Radio Link Control (RLC) layer, and the Packet Data Convergence Protocol (PDCP) layer are located in the first local gateway;

in a second mode, PHY layer is located in the first small base station, and MAC, RLC, and PDCP are located in the first local gateway;

in a third mode, PHY and MAC layers are located in the first small base station, and RLC, and PDCP layers are located in the first local gateway; and in a fourth mode, PHY, MAC and RLC layers are located in the first small base station, and PDCP layer is located in the first local gateway.

In connection with the fourth aspect, in a fourth possible implementation, the first local controller further includes:
a receiving unit configured to receive a link quality measurement report; and
the sending unit is further configured, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment, to send control signaling including reconfiguration information to the user equipment through the at least one first small base station, to send a switching instruction to the first small base station serving the user equipment, so that the first small base station serving the user equipment stops serving the user equipment, and to send a switching instruction and the reconfiguration information to the second small base station to which the user equipment needs to be switched, so that the second small base station to which the user equipment needs to be switched starts to serve the user equipment;
wherein the link quality measurement report includes either or both of the following instances:
a first instance includes a link quality measurement report measured by the user equipment for the first small base station, and a link quality measurement report measured by the user equipment for a small base station adjacent to the first small base station, and
a second instance includes a link quality measurement report measured by the first small base station for the user equipment, and a link quality measurement report measured by a small base station adjacent to the first small base station for the user equipment; and
the reconfiguration information is determined by the first local controller according to the configuration information of the user equipment in the second small base station.

In connection with the fourth aspect, in a fifth possible implementation, the first local controller further includes:
a receiving unit configured to receive a link quality measurement report;
the sending unit is further configured to send switching request signaling to a second local controller upon determining that that the user equipment needs to be switched to at least one third small base station hosted by the second local controller, according to the received link quality measurement report;
the receiving unit is further configured to receive switching acknowledgment signaling, including configuration information configured for the user equipment, sent by the second local controller; and
the sending unit is further configured to send the received switching acknowledgment signaling including the configuration information configured for the user equipment to the user equipment through the at least one first small base station; and
the link quality measurement report includes either or both of the following instances:
a first instance includes a link quality measurement report measured by the user equipment for the first small base station, and a link quality measurement report measured by the user equipment for a small base station adjacent to the first small base station, and
a second instance includes a link quality measurement report measured by the first small base station for the user equipment, and a link quality measurement report measured by a small base station adjacent to the first small base station for the user equipment.

In connection with the fourth aspect, in a sixth possible implementation, the sending unit is further configured, if the user equipment transmitting the user data is switched from the first small base station to a second small base station hosted by the first local controller and the first local gateway, to send first data forwarding control signaling to the first small base station, so that when there is no direct data channel established between the first small base station and the second small base station, to forward first forwarded data to the first local gateway, so that the first local gateway forwards the first forwarded data to the second small base station, and when there is a direct data channel established between the first small base station and the second small base station, to forward first forwarded data to the second small base station over the direct data channel; or when the user equipment transmitting the user data is switched from the first small base station to a third small base station hosted by a second local controller and a second local gateway, to send second data forwarding control signaling to the first small base station, so that when there is no direct data channel established between the first small base station and the third small base station, to forward first forwarded data to the first local gateway, so that the first local gateway forwards the first forwarded data to the third small base station through the second local gateway, or when there is a direct data channel established between the first small base station and the third small base station, to forward first forwarded data to the third small base station over the direct data channel; wherein the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

In connection with the fourth aspect, in a seventh possible implementation, the sending unit is further configured, when the user equipment transmitting the user data is switched from the first small base station to a third small base station hosted by a second local controller and a second local gateway, to send third data forwarding control signaling to the first local gateway, so that the first local gateway forwards second forwarded data to the second local gateway, and the second local gateway forwards the second forwarded data to the third small base station;
wherein the second forwarded data are determined by the first local gateway according to a transmission mode of the user data; and
the second forwarded data include at least non-transmitted user data buffered in the first local gateway.

In a fifth aspect, a first small base station hosted by a first local controller includes:
a receiving unit configured to receive data bearer configuration information for transmitting user data, from the first local controller;
an establishing unit configured to establish a data transmission channel according to the received data bearer configuration information; and
a transmitting unit configured to transmit the user data over the established data transmission channel.

With this possible implementation, the first local controller sends the data bearer configuration information to the first small base station, so that the first small base station establishes the data transmission channel according to the received data bearer configuration information, and further transmits user data, so the first local controller directly manages the first small station centrally, and controls the first small base station centrally to establish a data transmission channel, so that if the user equipment needs to transmit user data, then a data transmission channel will be established without involving any macro base station, and there will be no capability of the user equipment to be qualified, thus addressing the issues of the connections and the communication efficiency in the case of a large number of small base stations.

In connection with the fifth aspect, in a first possible implementation, the first small base station is hosted by a first local gateway; and the establishing unit is configured to establish a data transmission channel with the Internet upon determining that user data are to be transmitted directly over the Internet, according to the received data bearer configuration information; to establish a data transmission channel with the first local gateway upon determining that the first local gateway participates in transmission of user data, according to the received data bearer configuration information.

In connection with the fifth aspect, in a second possible implementation, the receiving unit is further configured to receive broadcast channel configuration information sent by the first local controller; and the first small base station further includes:
a sending unit configured to issue common control signaling according to the broadcast channel configuration information, so that the user equipment covered by the first small base station resides on the first small base station according to the common control signaling.

In connection with the fifth aspect, in a third possible implementation, the receiving unit is further configured to receive control signaling, including small base station configuration information, sent by the first local controller, and to provide the user equipment with a data transmission service according to the small base station configuration information, wherein the small base station configuration information is obtained by the first local controller as a result of interacting with a macro base station; and the user equipment is located in an intersection of a coverage area by the macro base station, and a coverage area by the first small base station, and resides on the macro base station when the user equipment is idle.

In connection with the first possible implementation of the fifth aspect, in a fourth possible implementation, the data bearer configuration information includes protocol stack configuration information of the first small base station;

the receiving unit is further configured to process the user data according to the received protocol stack configuration information before the transmitting unit transmits the user data over the established data transmission channel; and the transmitting unit is configured to transmit the processed user data over the data transmission channel established between the first small base station and the first local gateway;

wherein the protocol stack configuration information of the first small base station is configured for the first small base station by the first local controller according to a network condition, and the performance of a backhaul link between the first small base station and the first local gateway; and the protocol stack configuration information is configured in any one of the following modes:

in a first mode, the Physical (PHY) layer, the Media Access Control (MAC) layer, the Radio Link Control (RLC) layer, and the Packet Data Convergence Protocol (PDCP) layer are located in the first local gateway;

in a second mode, PHY layer is located in the first small base station, and MAC, RLC, and PDCP layers are located in the first local gateway;

in a third mode, PHY and MAC layers are located in the first small base station, and RLC, and PDCP layers are located in the first local gateway; and in a fourth mode, PHY, MAC and RLC layers are located in the first small base station, and PDCP layer is located in the first local gateway.

In connection with the fifth aspect, in a fifth possible implementation, the first small base station further includes:

a sending unit configured to send a link quality measurement report to the first local controller;

wherein the receiving unit is further configured to receive controlling signaling including reconfiguration information, and a switching instruction, from the first local controller; and to send the received control signaling including the reconfiguration information to the user equipment, so that the user equipment is switched to a second small base station; and the first small base station stops serving the user equipment, according to the switching instruction, wherein the control signaling including the reconfiguration information, and the switching instruction is issued by the first local controller, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment;

the link quality measurement report includes either or both of the following instances:

a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment; and the reconfiguration information is determined by the first local controller according to configuration information of the user equipment in a third small base station.

In connection with the fifth aspect, in a sixth possible implementation, the first small base station further includes:

a sending unit configured to send a link quality measurement report to the first local controller;

wherein the receiving unit is further configured to receive switching acknowledgement signaling, including configuration information configured for the user equipment, from a second local controller through the first local controller;

the sending unit is further configured to send the received switching acknowledgement signaling including the reconfiguration information to the user equipment, so that the user equipment is switched to a third small base station; and the first small base station stops serving the user equipment, according to the switching acknowledgement signaling;

wherein the switching acknowledgement signaling is sent by the second local controller upon reception of a switching request of the first local controller to switch the user equipment to at least one third small base station hosted by the second local controller, and the third small base station is hosted by the second local controller;

the link quality measurement report includes either or both of the following instances:

a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment.

In connection with the fifth aspect, in a seventh possible implementation, the first small base station further includes:

a data forwarding unit configured, when the user equipment transmitting the user data is switched from the first small base station to a second small base station hosted by the first local controller and a first local gateway, after the receiving unit receives first data forwarding control signaling of the first local controller, when there is a direct data channel established between the first small base station and the second small base station, to forward first forwarded data to the second small base station over the direct data channel; and when there is no direct data channel established between the first small base station and the second small base station, to forward first forwarded data to the first local gateway, so that the first local gateway forwards the first forwarded data to the second small base station; and when the user equipment transmitting the user data is switched from the first small base station to a third small base station hosted by a second local controller and a second local gateway, after the receiving unit receives second data forwarding control signaling of the first local controller, when there is a direct data channel established between the first small base station and the third small base station, to forward first forwarded data to the third small base station over the direct data channel; and when there is no direct data channel established between the first small base station and the third small base station, to forward the first forwarded data to the first local gateway, so that the first local gateway forwards the first forwarded data to the third small base station through the second local gateway;

wherein the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

In a sixth aspect, a first local gateway includes:

a receiving unit configured to receive data bearer configuration information for transmitting user data, from a first local controller;

an establishing unit configured to establish a data transmission channel according to the received data bearer configuration information; and a transmitting unit configured to transmit the user data over the established data transmission channel.

With this possible implementation, the first local controller sends the data bearer configuration information to the first local gateway, so that the first local gateway establishes the data transmission channel according to the received data bearer configuration information, and further transmits user data, so the first local controller directly controls the first local gateway to establish a data transmission channel, so that if the user equipment needs to transmit user data, then a data transmission channel will be established without involving any macro base station, but user data will be transmitted over the data transmission channel established by the first local gateway, thus addressing the issues of the connections and the communication efficiency in the case of a large number of small base stations.

In connection with the sixth aspect, in a first possible implementation, the establishing unit is configured to determine at least one first small base station to participate in transmission of user data, according to the received data bearer configuration information; and to establish the data transmission channel with the determined at least one first small base station;

wherein the first small base station is hosted by the first local gateway and the first local controller.

In connection with the first possible implementation of the sixth aspect, in a second possible implementation, the establishing unit is further configured to establish a data transmission channel with the Internet upon determining that user data are to be transmitted directly over the Internet, according to the received data bearer configuration information; to establish a data transmission channel with a core network upon determining that the core network participates in transmission of user data, according to the received data bearer configuration information; to establish a data transmission channel with at least one second small base station upon determining that the at least one second small base station participates in transmission of user data, according to the received data bearer configuration information; to establish a data transmission channel with a second local gateway upon determining that the second local gateway participates in transmission of user data, according to the received data bearer configuration information, so that the first local gateway transmits user equipment of a first user equipment to a second user equipment through the second local gateway, and receives user data, transmitted by the second user equipment to the first user equipment, through the second local gateway;

wherein the second small base station is hosted by the first local gateway and the first local controller, the first user equipment is hosted by the first local gateway, and the second user equipment is hosted by the second local gateway.

In connection with the second possible implementation of the sixth aspect, in a third possible implementation, the data bearer configuration information includes protocol stack configuration information of the respective first small base stations; and the first local gateway further includes:

a processing unit configured to process the user data according to the protocol stack configuration information of the first small base station before the transmitting unit transmits the user data over the established data transmission channel, and after the user data of the first small base station is received; and the transmitting unit is configured to transmit the processed user data over the data transmission channel established with the at least one first small base station;

wherein the protocol stack configuration information of the first small base station is configured for the first small base station by the first local controller according to a network condition, and the performance of a backhaul link between the first small base station and the first local gateway; and the protocol stack configuration information is configured in any one of the following modes:

in a first mode, the Physical (PHY) layer, the Media Access Control (MAC) layer, the Radio Link Control (RLC) layer, and the Packet Data Convergence Protocol (PDCP) layer are located in the first local gateway;

in a second mode, PHY layer is located in the first small base station, and MAC, RLC, and PDCP layers are located in the first local gateway;

in a third mode, PHY and MAC layers are located in the first small base station, and RLC, and PDCP layers are located in the first local gateway; and in a fourth mode, PHY, MAC and RLC layers are located in the first small base station, and PDCP layer is located in the first local gateway.

In connection with the sixth aspect, in a fourth possible implementation, the first local gateway further includes:

a forwarding unit configured, when the user equipment transmitting the user data is switched from the first small base station to a second small base station hosted by the first local controller and the first local gateway, to forward first forwarded data forwarded by the first small base station to the second small base station; and when the user equipment transmitting the user data is switched from the first small base station to a third small base station hosted by a second local controller and a second local gateway, to forward first forwarded data forwarded by the first small base station to the second local gateway, so that the second local gateway sends the received first forwarded data to the third small base station; wherein the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

In connection with the sixth aspect, in a fifth possible implementation, the receiving unit is further configured, when the user equipment transmitting the user data is switched from the first small base station to a third small base station hosted by a second local controller and a second local gateway, to receive third data forwarded control signaling from the first local controller; and the first local gateway further includes:

a data forwarding unit configured to forward second forwarded data to the second local gateway, so that the second local gateway sends the received second forwarded data to the third small base station, wherein the second forwarded data are determined by the first local gateway according to a transmission mode of the user data; and the second forwarded data includes at least non-transmitted user data buffered in the first local gateway.

In a seventh aspect, a communication system includes a first local controller, a first small base station, and a first local gateway, wherein:

the first local controller is configured to determine that there is a user equipment for which a data bearer needs to be established; to generate data bearer configuration information for transmitting the user data; and to send the data bearer configuration information to the first local gateway and/or at least one first small base station, wherein the user equipment is hosted by the first local controller and the first local gateway, and the first small base station serves the user equipment;

the first small base station is configured to receive the data bearer configuration information for transmitting user data, from the first local controller; to establish a data transmission channel according to the received data bearer configuration information; and to transmit the user data over the established data transmission channel; wherein the first small base station is hosted by the first local controller and the first local gateway; and the first local gateway is configured to receive the data bearer configuration information for transmitting user data, from the first local controller; to establish a data transmission channel according to the received data bearer configuration information; and to transmit the user data over the established data transmission channel.

In an eighth aspect, a first local controller includes a processor, a transceiver, and a memory, all of which communicate with each other via a bus interface, wherein:

the processor is configured to read program in the memory, and to further perform the processes of:

determining that there is a user equipment for which a data bearer needs to be established; generating data bearer configuration information for transmitting the user data; and sending the data bearer configuration information to a first local gateway and/or at least one first small base station through the transceiver, so that the network element entity receiving the data bearer configuration information establishes a data transmission channel according to the data bearer configuration information, wherein the user equipment is hosted by the first local controller and the first local gateway, and the first small base station serves the user equipment; and the transceiver is configured to be controlled by the processor 1100 to transmit and receive data.

In a ninth aspect, a first small base station includes a processor, a transceiver, and a memory, all of which communicate with each other via a bus interface, wherein:

the processor is configured to read program in the memory, and to further perform the processes of:

receiving data bearer configuration information for transmitting user data, from a first local controller through the transceiver; establishing a data transmission channel according to the received data bearer configuration information; and transmitting the user data over the established data transmission channel; wherein the first small base station is hosted by the first local controller.

In a tenth aspect, a first local gateway includes a processor, a transceiver, and a memory, all of which communicate with each other via a bus interface, wherein:

the processor is configured to read program in the memory, and to further perform the processes of:

receiving data bearer configuration information for transmitting user data, from a first local controller through the transceiver; establishing a data transmission channel according to the received data bearer configuration information; and transmitting the user data over the established data transmission channel.

With this possible implementation, the first local controller sends the data bearer configuration information to the first local gateway and/or the at least one first small base station, so that the first local gateway establishes the data transmission channel according to the received data bearer configuration information, and further transmits user data, and the first small base station establishes the data transmission channel according to the received data bearer configuration information, and further transmits user data, so the first local controller directly manages the first small station centrally, and controls the first small base station and the first local gateway centrally to establish a data transmission channel, so that if the user equipment needs to transmit user data, then a data transmission channel will be established without involving any macro base station, and there will be no capability of the user equipment to be qualified, thus addressing the issues of the connections and the communication efficiency in the case of a large number of small base stations.

DETAILED DESCRIPTION OF THE EMBODIMENTS

Embodiments of the invention propose a communication method in which a first local controller generates data bearer configuration information for transmitting the user data, upon determining that there is a user equipment for which a data bearer needs to be established; and the first local controller sends the data bearer configuration information to a first local gateway and/or at least one first small base station, so that the network element entity receiving the data bearer configuration information establishes a data transmission channel according to the data bearer configuration information, where the user equipment is hosted by the first local controller and the first local gateway, and the first small base station serves the user equipment. The first local controller transmits the data bearer configuration information to the first local gateway and/or the at least one first small base station, the first local gateway establishes a data transmission channel according to the received data bearer configuration information, and further transmits user data, and the first small base station establishes a data transmission channel according to the received data bearer configuration information, and further transmits user data, so the first local controller directly manages the first small stations centrally, and controls the first small base stations and the first local gateway centrally to establish a data transmission channel, so that if the user equipment needs to transmit user data, then a data transmission channel will be established without involving any macro base station, and there will be no capability of the user equipment to be qualified, thus addressing the issues of the connections and the communication efficiency in the case of a large number of small base stations.

Preferred embodiments of the invention will be described below with reference to the drawings, and it shall be appreciated that the preferred embodiments described here are merely intended to illustrate and explain the invention, but not to limit the invention thereto. The embodiments of the invention, and the features in the embodiments can be combined with each other unless they conflict with each other.

In order to describe the solutions according to the embodiments of the invention clearly, firstly a network architecture in which the communication method according to the embodiments of the invention is performed will be described, and then communication methods for transmitting the user data in the network architecture; controlling an idle user equipment; configuring a protocol stack; switching in a local controller/local gateway a user equipment between cells, and forwarding data while switching the user equipment between the cells; switching across a local controller/local gateway a user equipment between cells, and forwarding data while switching the user equipment between the cells; etc., will be described in that order.

Figure 1:
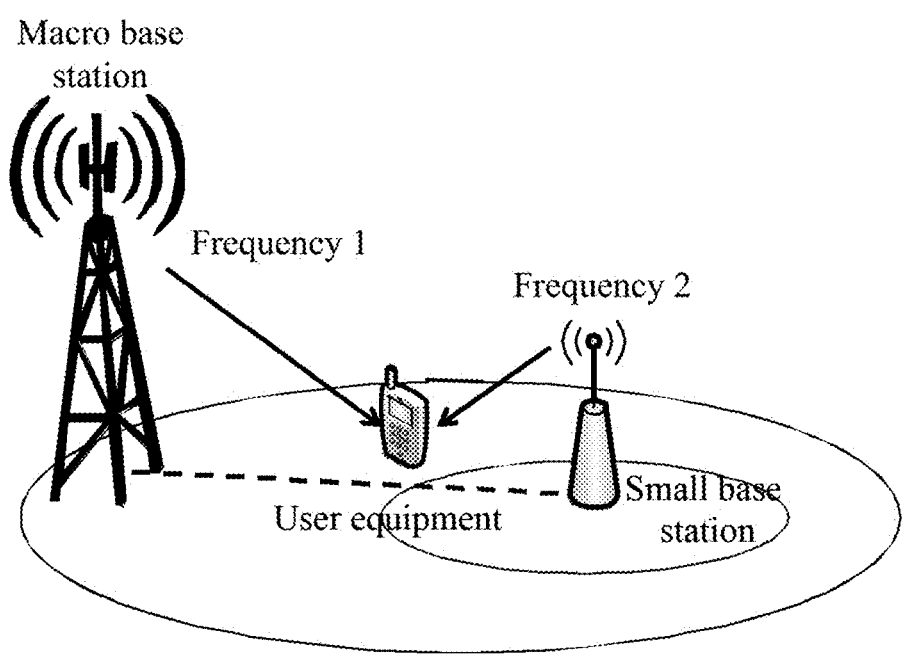
FIG. 1 is a schematic structural diagram of the dual-connectivity architecture in the prior art to the invention.
Figure 2:
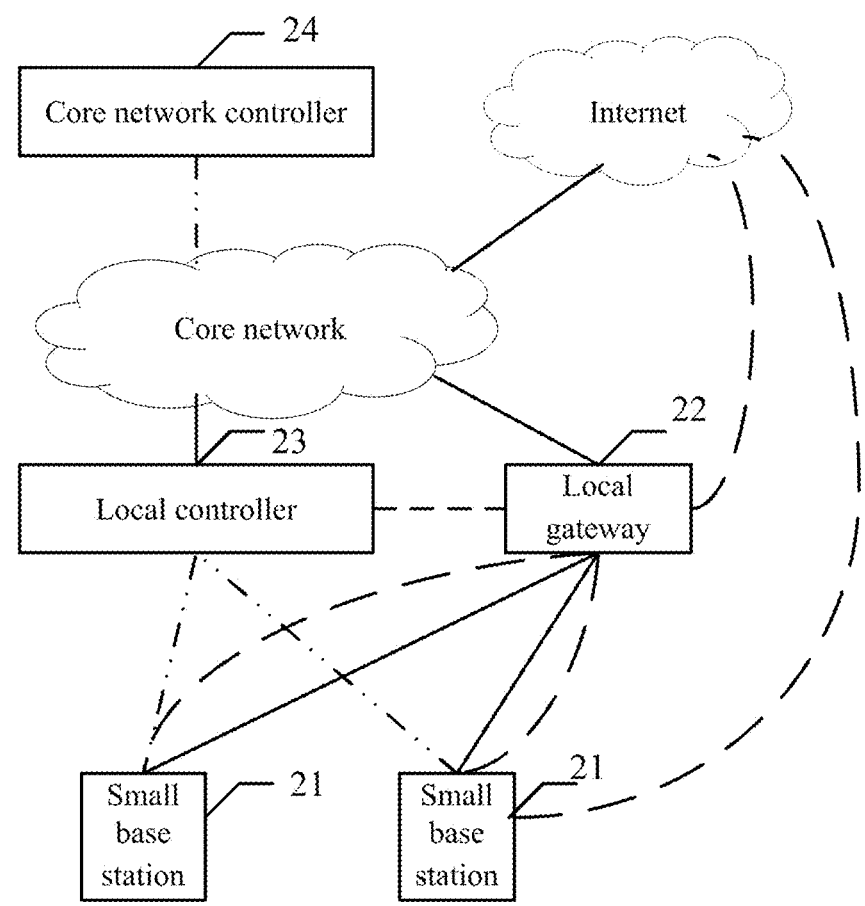
FIG. 2 is a schematic structural diagram of a network architecture in accordance with an embodiment of the invention.

Referring to FIG. 2 which is a schematic diagram of a network architecture in accordance with an embodiment of the invention, the network architecture includes small base stations 21, a local gateway 22, a local controller 23, and a core network controller 24, where:

The local controller 23 and the local gateway 22 are used as a control-plane anchor and a user-plane anchor of the small base stations 21 respectively that are responsible for handling procedures related to the small base stations. From the perspective of the control plane, the small base stations access a core network through the local controller, and are managed by the core network controller as a result (as shown by control-plane data transmission channels in FIG. 2). From the perspective of the user plane, the small base stations access the core network through the local gateway, or access the Internet directly (as shown by user-plane data transmission channels or local direct data transmission channels in FIG. 2). The local controller 23 and the local gateway 22 can be two functions of an entity, or can be two nodes with interfaces, although the local controller and the local gateway will be described as two nodes with interfaces in the embodiments of the invention by way of an example.

The local controller 23 generally functions to act as the control-plane anchor of the small base stations to process control-plane signaling related to the small base stations; to terminate and process core network signaling related to the small base stations; to trigger and manage access control signaling related to a user equipment, and to signaling-interact with the user equipment through the small base stations; to manage and coordinate resources of the small base stations, e.g., to manage operating frequencies, power, and other resources of the small base stations, and to control the base station to or not to send common control signaling, etc.; to manage mobility between the small base stations; to manage mobility across the local controller; and to security-manage the small base stations.

The local gateway 22 generally functions to act as the user-plane anchor of the small base stations; to perform data forwarding and to switch a path while switching between cells; and to security-manage the user plane.

For the sake of a convenient description, the communication method according to the embodiments of the invention will be described primarily from the perspectives of the first local controller, the first small base station, and the first local gateway without any loss of generality.

Firstly, relationships between a first small base station, a second small base station, a third small base station, a first local controller, a first local gateway, a second local gateway, and a second local controller involved in the communication method to be described below will be described.

The first local gateway is controlled by the first local controller; and the second local gateway is controlled by the second local controller;

Both user-plane anchors of the first small base station and the second small base station are the first local gateway, and both control-plane anchors of the first small base station and the second small base station are the first local controller, that is, both the first small base station and the second small base station are hosted by the first local gateway and the first local controller; and A user-plane anchor of the third small base station is the second local gateway, and a control-plane anchor of the third small base station is the second local controller, that is, the third small base station is hosted by the second local gateway and the second local controller.

(I) Transmission of User Data

Figure 3:
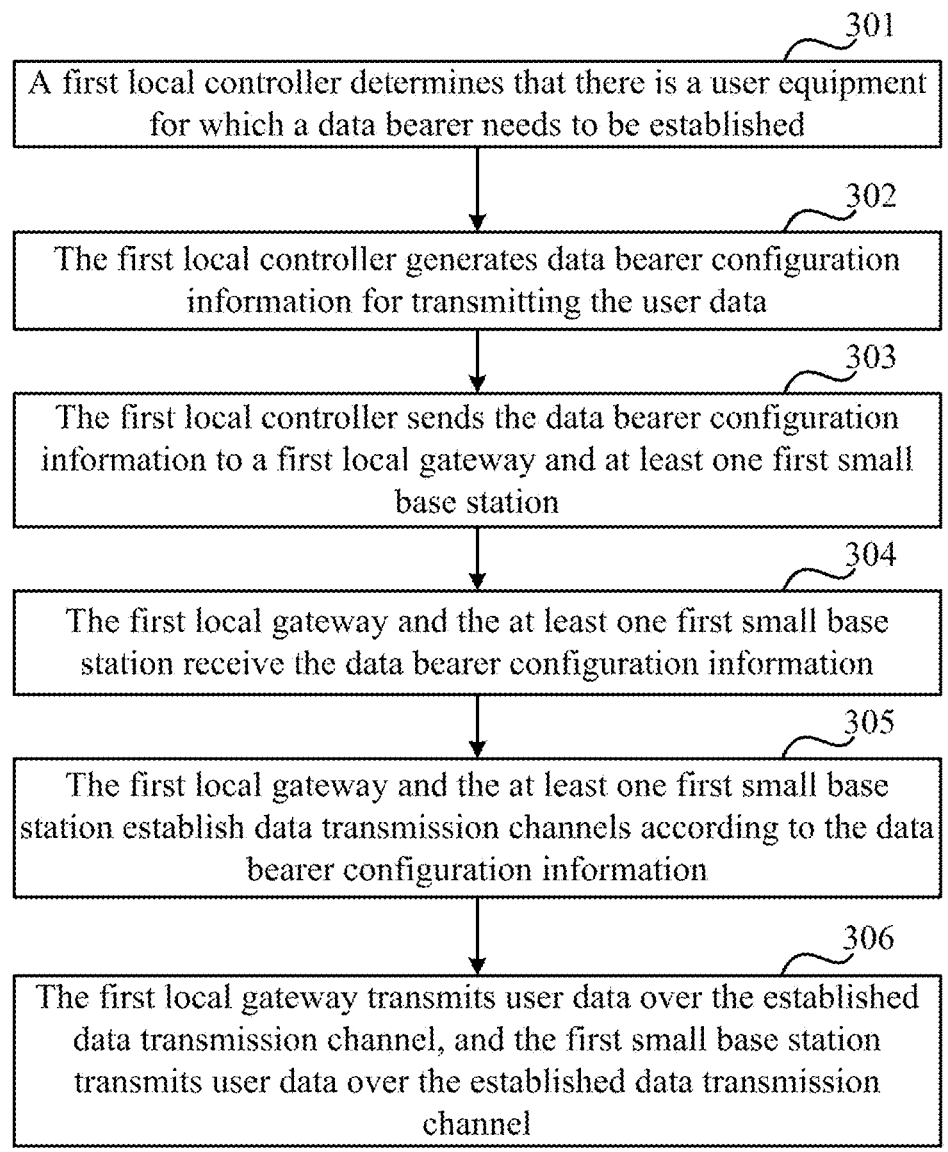
FIG. 3 is a flow chart of a method for transmitting the user data in accordance with an embodiment of the invention.
Figure 4:
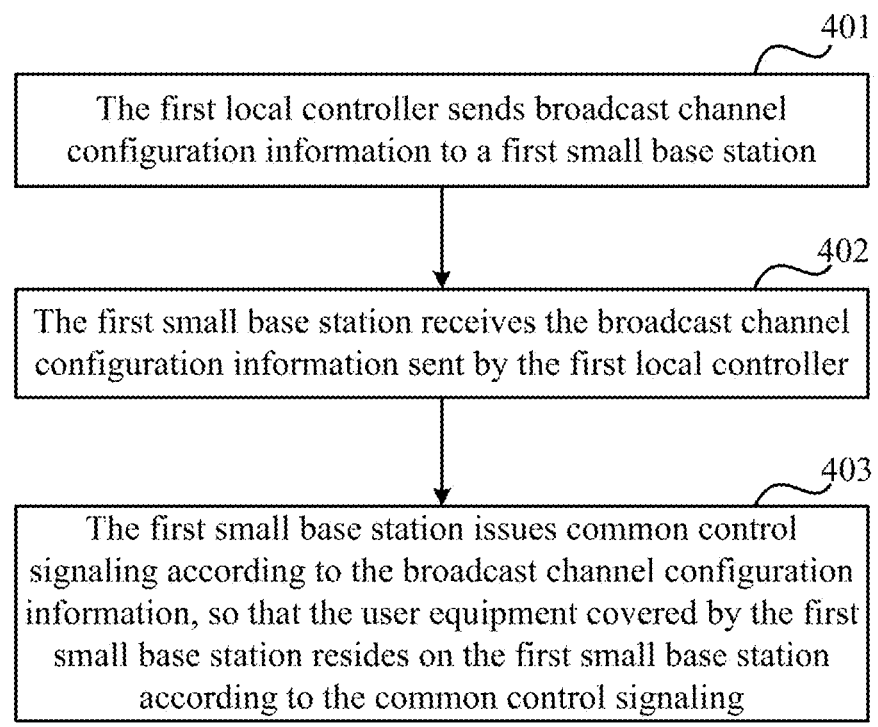
FIG. 4 is a flow chart of enabling a user equipment to reside on some small base station in accordance with an embodiment of the invention.
Figure 5:
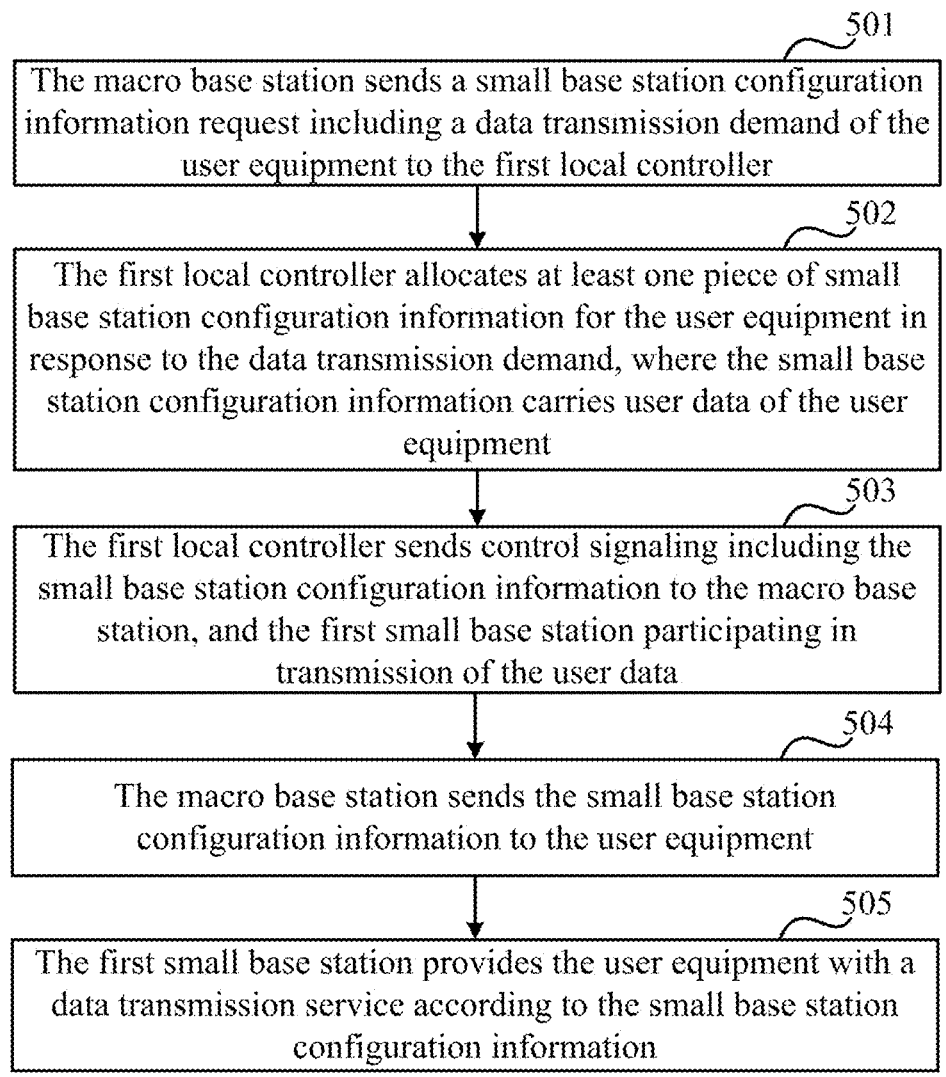
FIG. 5 is a flow chart of enabling a user equipment residing on a macro base station to transmit user data through a first small base station in accordance with an embodiment of the invention.

Referring to FIG. 3, it is a flow chart of a method for transmitting the user data in accordance with a third embodiment of the invention, where the method includes the following steps:

In the step 301, a first local controller determines that there is a user equipment for which a data bearer needs to be established.

In this step 301, when the user equipment needs to establish a data bearer (for data transmission) and the user equipment is in disconnected, then the user equipment notifies the first local controller of a need for interaction, by establishing a Radio Resource Control (RRC) connection with the first local controller, so that the first local controller knows the need for data transmission, and parameter information for data transmission (e.g., a data transmission rate), and further can determine that the user equipment needs to establish a data bearer, and generate bearer configuration information for the user equipment.

In the step 302, the first local controller generates data bearer configuration information for transmitting the user data.

The bearer configuration information includes a user data transmission rate, and optionally data transmission path information, or information about network element nodes, and information about a network, participating in data transmission.

If a first local gateway or the first small base station is not configured any default path, or does not apply any default path, then the bearer configuration information may include the information about the network element nodes, and the information about the network, participating in data transmission, and if default data transmission path information is present and applied in the first local gateway or the first small base station, then the bearer configuration information may not include the information about the network element nodes, and the information about the network, participating in data transmission.

In the step 303, the first local controller sends the data bearer configuration information to a first local gateway and at least one first small base station.

Since a plurality of small base stations hosted by the first local controller may need to serve a user equipment concurrently, the data bearer configuration information is sent to the at least one first small base station in this step 303.

In this step 303, the first local controller may alternatively send the data bearer configuration information to only the first local gateway, and at this time, the first local gateway can establish a data transmission channel using the data bearer configuration information; or the first local controller may alternatively send the data bearer configuration information to only the at least one first small base station, and at this time, the first small base station receiving the bearer configuration information can establish a data transmission channel using the data bearer configuration information.

In the step 304, the first local gateway and the at least one first small base station receive the data bearer configuration information.

In the step 305, the first local gateway and the at least one first small base station establish data transmission channels according to the data bearer configuration information, where the user equipment is hosted by the first local controller and the first local gateway, and the first small base station serves the user equipment.

In the step 306, the first local gateway transmits user data over the established data transmission channel, and the first small base station transmits user data over the established data transmission channel.

Preferably the first small base station establishes a data transmission channel according to the received data bearer configuration information as follows: the first small base station establishes a data transmission channel with the Internet upon determining that user data are to be transmitted directly over the Internet, according to the received data bearer configuration information.

The first small base station determines that user data are to be transmitted directly over the Internet here refers to the determination that the first small base station is connected directly with the Internet.

The first small base station establishes a data transmission channel with the first local gateway upon determining that the first local gateway participates in transmission of user data, according to the received data bearer configuration information.

Preferably the first local gateway establishes a data transmission channel according to the received data bearer configuration information as follows: the first local gateway determines the at least one small base station to participate in transmission of user data, according to the received data bearer configuration information; and The first local gateway establishes a data transmission channel with the determined at least one small base station;

Where the first small base station is hosted by the first local gateway and the first local controller.

Preferably the first local gateway further establishes a data transmission channel according to the received data bearer configuration information as follows: the first local gateway establishes a data transmission channel with the Internet upon determining that user data are to be transmitted directly over the Internet, according to the received data bearer configuration information.

The first local gateway determines that user data are to be transmitted directly over the Internet here refers to the determination that the first local gateway is connected directly with the Internet.

The first local gateway establishes a data transmission channel with a core network upon determining that the core network participates in transmission of user data, according to the received data bearer configuration information.

The first local gateway establishes a data transmission channel with at least one second small base station upon determining that the at least one second small base station participates in transmission of user data, according to the received data bearer configuration information; and The first local gateway establishes a data transmission channel with a second local gateway upon determining that the second local gateway participates in transmission of user data, according to the received data bearer configuration information, so that the first local gateway transmits user data of a first user equipment to the second user equipment through the second local gateway, and receives user data, transmitted by the second user equipment to the first user equipment, through the second local gateway;

Where the second small base station is hosted by the first local gateway and the first local controller, the first user equipment is hosted by the first local gateway, and the second user equipment is hosted by the second local gateway.

After the data transmission channels are established as described above, the data transmission channels established by the first local gateway and the first small base station under the control of the first local controller include the following five data transmission channels:

The first data transmission channel is the first user equipment <-> the first small base station <-> the first local gateway <-> the core network <-> the Internet/the second user equipment;

The second data transmission channel is the first user equipment <-> the first small base station <-> the Internet;

The third data transmission channel is the first user equipment <-> the first small base station <-> the first local gateway <-> the Internet;

The fourth data transmission channel is the first user equipment <-> the first small base station <-> the first local gateway <-> the second small base station <-> the third user equipment; and The fifth data transmission channel is the first user equipment <-> the first small base station <-> the first local gateway <-> the second local gateway <-> the third small base station <-> the second user equipment;

Where the first data transmission channel is a common data transmission channel, and the second to fifth data transmission channels are local direct data transmission channels established under the control of the first local controller to optimize the data transmission channel; and once the local direct data transmission channels are established, a delay in transmission of user data will be greatly shortened, consumed network resources will be reduced, and the communication efficiency, and the experience of a user will be improved.

(II) Control on an Idle User Equipment

Typically several small base stations are controlled by a local controller/local gateway, and there may be different cell identifiers, and corresponding broadcast messages and other common control information, so that the idle user equipment can reside normally on the respective small base stations, and further be connected, and transmit data at a high rate over frequency resources of the small base stations; and However a small base station has a small coverage area, and may operate at a high frequency, and the small base station is primarily configured to improve the transmission rate of the connected user equipment so as to enhance the transmission rate at a hot spot, so the small base station can simply control the mobility and residing of the idle user equipment for which no large-bandwidth and high-rate transmission is required.

Accordingly in the solution according to an embodiment of the invention, the idle user equipment may reside on a part of the small base stations, or may reside on a macro base station, as controlled by the local controller, and corresponding implementations thereof will be introduced below respectively.

(1) The user equipment can reside on some of the small base stations in the following steps:

In the step 401, the first local controller sends broadcast channel configuration information to a first small base station;

In this step 401, if the first local controller does not send any broadcast channel configuration information to the first small base station, then the first small base station can't issue any broadcast message, which is common control signaling, for the user equipment to reside, and the user equipment will neither search for nor further reside on the small base station;

In this step 401, if the first local controller does not send any broadcast channel configuration information to the first small base station covering the user equipment, then the idle user equipment is unable to search for and locate the first small base station, but has to reside on the macro base station.

In the step 402, the first small base station receives the broadcast channel configuration information sent by the first local controller; and In the step 403, the first small base station issues common control signaling according to the broadcast channel configuration information, so that the user equipment covered by the first small base station resides on the first small base station according to the common control signaling.

In this step 403, the common control signaling issued by the first small base station can include a cell identifier, so that the user equipment resides, where the cell identifier can be the identifier of the first small base station (assigned separately for each small base station), or can be a cell identifier common to a plurality of small base stations (the plurality of small base stations share the cell identifier).

The user equipment is allowed as such to reside on a part of the small base stations, so that the user equipment can be connected rapidly at the frequencies of the small base station to enjoy a high-rate data service. However, the frequencies of the small base stations may span a large bandwidth, and there are a large number of nodes, so in order to lower an overhead of network-side common signaling, and also the complexity of measuring and processing at the user equipment, a part of the frequencies, and a part of the small base stations can be controlled by the first local controller to admit the residing user equipment. For example, if there are 10 operating frequencies for the small base stations, then the user equipment will be allowed to reside at one or two of the frequencies, and only a user equipment in connection state can be allowed to access the other frequencies; and since there is such a close distance between the small base stations, at the frequency the user equipment is allowed to reside, that there is significant interference and an intersection between their coverage areas, not all the small base stations at the frequency where the user equipment is allowed to reside may admit the residing user equipment, but a part of them may allow the user equipment to reside, or a part of them may send common control signaling to be sensed by the user equipment, and the others may simply keep silent over a time-frequency resource over which the common control signaling is sent, for the purpose of saving energy and lowering interference, where the small base stations sending the common control signaling are controlled collectively by the local controller to thereby guarantee some continuity of their coverage areas.

Furthermore for a series of first small base stations with continuous coverage areas, the first local controller can further send the same common control signaling to these first small base stations, for example, all the cell identifiers, system information, etc., are the same, first small base stations at the same frequency send the same broadcast information over the same time-frequency resource, and a plurality of first small base stations apply the same cell parameter, so that the plurality of first small base stations constitute a cell with a large coverage area where the user equipment may reside. If the user equipment resides in the coverage area of this series of first small base stations with continuous coverage areas, then the user equipment will equivalently reside on the macro base station with a large coverage area, thus lowering the complexity and the overhead. The same signaling over the same resource comes from the different first small base stations, thus further enhancing the effect of diversity reception by the user equipment, and improving the signal to noise ratio and the quality of receiving the common signaling. For connected user equipments, the different user equipments are served over different small base station resources (which can be included in small base station configuration information), or the same user equipment is served over a plurality of small base station resources, so that the utilization of spectrums can be improved to some extent using the cell splitting technology where the number of base stations is increased.

(2) The user equipment resides on the macro base station:

Generally the macro base station has a larger coverage area than a small base station, and if the user equipment resides on the macro base station, then a signaling overhead, a measurement overhead, etc., for residing can be saved. Accordingly there is such a network deployment pattern that the macro base station is responsible for an idle user equipment to reside, and only a connected user equipment can access a resource of the small base station; and in this case, there is an interface to be configured between the macro base station, and the local controller/gateway of the small base station, so that they can negotiate about an usage of the frequency resource of the small base station, and other configuration information of the small base station by the user equipment, switching of the user equipment, etc.

The majority of small base stations do not allow the user equipment to reside, and in a feasible implementation, no normal common control signaling can be sent over the resources of these small base stations, for example, no broadcast message will be sent over the resources. Of course, there are some small base stations to allow the user equipment to reside, for example, a small base station in a Closed Subscriber Group (CSG) can send by itself common signaling, e.g., a broadcast message, etc., so that the user equipment resides normally.

Typically the user equipment resides at the frequency of the macro base station, and only when the user needs to transmit data, then the macro base station negotiates via the interface with the local controller, and switches the user equipment to operate at the frequency of the small base station.

An interaction procedure between the macro base station, the first local controller, and the first small base station when the user equipment residing on the macro base station is switched from the idle state to the connected state, and needs to transmit user data through the first small base station will be described below, where the procedure is performed by the first local controller and the first small base station.

In the step 501, the macro base station sends a small base station configuration information request, including a data transmission demand of the user equipment, to the first local controller;

In the step 502, the first local controller allocates at least one piece of small base station configuration information for the user equipment in response to the data transmission demand, where the small base station configuration information carries user data of the user equipment;

In the step 503, the first local controller sends control signaling including the small base station configuration information to the macro base station, and the first small base station participating in transmission of the user data;

In the step 504, the macro base station sends the small base station configuration information to the user equipment; and In the step 505, the first small base station provides the user equipment with a data transmission service according to the small base station configuration information.

(III) Configuration of a Protocol Stack

Figure 6A:
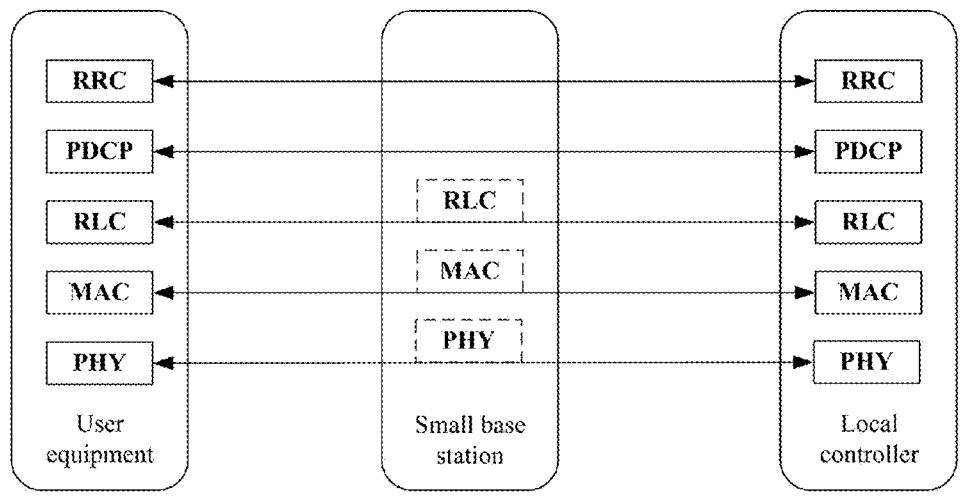
FIG. 6A is a schematic diagram of a control-plane protocol stack in accordance with an embodiment of the invention.
Figure 6B:
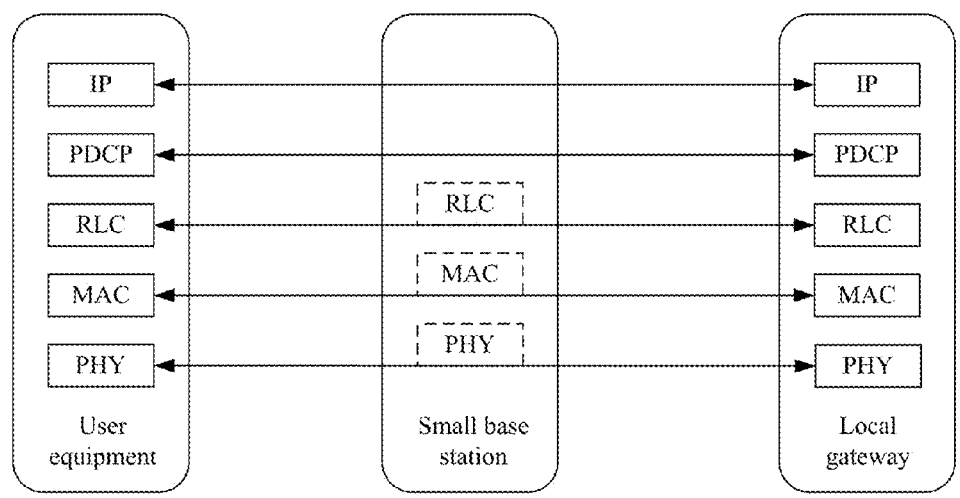
FIG. 6B is a schematic diagram of a user-plane protocol stack in accordance with an embodiment of the invention.

Referring to FIG. 6A, it is a schematic diagram of a control-plane protocol stack; and referring to FIG. 6B, it is a schematic diagram of a user-plane protocol stack.

Since a control-plane bearer of an air interface is strongly related to a user-plane bearer of the air interface, and even the former controls the latter, when a control-plane anchor and a user-plane anchor are separate nodes, then there needs an ideal backhaul link for real-time and synchronous interaction between these two anchors. From the perspective of the architecture of the protocol stack, these two anchors are located in the same entity in a convenient implementation.

In the schematic diagrams of the protocol stacks in FIG. 6A and FIG. 6B, both the Packet Data Convergence Protocol (PDCP) layer and the Internet Protocol (IP) are located in a central node (a local controller/gateway), and three protocol layers including the Radio Link Control (RLC), Media Access Control (MAC), and Physical (PHY) layers are represented in dotted box in the small base station in the following four protocol stack configuration modes:

In a first mode, all the three protocol layers of RLC, MAC, and PHY are located in the central node (the local controller/gateway), and the small base station only acts as an antenna port through which physical-layer data are transmitted via the air interface;

In a second mode, PHY is located in the small base station node, and MAC and RLC are located in the central node, so that the small base station only processes and transmits physical-layer data via the air interface, and the other functions of scheduling, retransmitting an Automatic Repeat-Request (ARQ), etc., are still performed in the central node;

In a third mode, the PHY and MAC layers are located in the small base station node, and the RLC layer is located in the central node, so that the small base station processes and transmits MAC-layer data, and performs the functions of scheduling, retransmitting a Hybrid Automatic Repeat-Request (HARQ), etc., and the RLC functions including ARQ retransmission, etc., are performed in the central node; and In a fourth mode, all of PHY, MAC, and RLC are located in the small base station node, so that the small base station processes and transmits RLC-layer data, and performs the functions of scheduling, HARQ and ARQ retransmission, etc.

For the small base station, the protocol stack is configured in such one of the four modes above that is determined as a function of the network condition, and the performance of the backhaul link between the small base station and the local gateway, and then the small base station is configured with that mode. For the local controller, different architectures of the protocol stack can be allowed to be configured in the local controller.

An example will be described below of how the local controller selects one of the architectures of the protocol stacks:

The network condition typically refers to power conditions and interference conditions of small base stations currently active in the network, and an architectural condition of the protocol stack, and also remaining processing capacities of the network nodes, etc., and generally if the remaining processing capacities of the surrounding small base stations allow the small base stations to interoperate at the physical layer, then the central node will handle as many protocol layers as possible, for example, in the first or second mode above; otherwise, the small base stations will be provided with more protocol layers, e.g., in the third or fourth mode; and The performance of the backhaul link is generally categorized into an ideal backhaul link and a non-ideal backhaul link, where a backhaul link with a shorter delay and a large bandwidth more approaches the ideal backhaul link, and there is a better transmission effect of the backhaul link more approaching the ideal backhaul link; and at this time, lower-layer data can be transmitted between the small base station and the central node, for example, in the first or second protocol stack mode; on the contrary, if there is a long delay and a low bandwidth of the backhaul link, then higher-layer data will be transmitted between the small base station and the central node, for example, in the third or fourth protocol stack mode.

For the user equipment, it needs to know which one of the protocol stack modes above is applied to its current serving small base station, where this information can be carried in configuration signaling sent by the local controller/local gateway to the user equipment.

From the perspective of the control plane, the RRC entity and the PDCP entity are located in the central node all the time, so both the control function and the signaling procedure of the user equipment are performed by the local controller, and security-related functions are also performed by the central node. From the perspective of the user plane, the PDCP entity is located in the central node all the time, so user-plane security functions are handled collectively by the central node. The security of transmission over one or more air interface links between the central node and the user equipment is guaranteed by the end-to-end PDCP entities all the time.

For transmission of user data in (I) as described above, the bearer configuration information includes such protocol stack configuration information configured by the first local controller for the first small base station that includes any one of the four protocol stack configuration modes above.

Transmission of user data will be further described below in connection with the protocol stack configuration information:

Preferably the first local controller configures the first small base station with protocol stack configuration information according to the network condition, and the performance of the backhaul link between the first small base station and the first local gateway;

The first local controller sends the bearer configuration information to the first local gateway as follows:

The first local controller carries the protocol stack configuration information configured for the first small base station, in the data bearer configuration information, and sends the data bearer configuration information to the first local gateway, so that the first local gateway processes user data received from the first small base station according to the protocol stack configuration information of the first small base station;

The first local controller sends the bearer configuration information to the at least one first small base station as follows:

The first local controller carries the protocol stack configuration information configured for the first small base station, in the data bearer configuration information, and sends the data bearer configuration information to the first small base station, so that the first small base station processes user data according to the received protocol stack configuration information; and The first local controller sends the bearer configuration information to the first local gateway and the at least one first small base station as follows:

The first local controller carries the protocol stack configuration information configured for the respective first small base stations, in the data bearer configuration information, and sends the data bearer configuration information to the first local gateway; and carries the protocol stack configuration information configured for the first small base stations, in the data bearer configuration information, and sends the data bearer configuration information to the first small base stations, so that the first small base stations process user data according to the received protocol stack configuration information, and the first local gateway processes user data received from the first small base stations according to the protocol stack configuration information of the first small base stations.

Preferably before the first small base station transmits user data over the established data transmission channel, the method further includes:

The first small base station processes user data according to the received protocol stack configuration information, and The first small base station transmits user data over the established data transmission channel as follows:

The first small base station transmits the processed user data over the data transmission channel established between the first small base station and the first local gateway; and Preferably before the first local gateway transmits user data over the established data transmission channel, the method further includes:

The first local gateway processes user data of the first small base station according to the protocol stack configuration information of the first small base station upon reception of the user data; and The first local gateway transmits user data over the established data transmission channel as follows:

The first local gateway transmits the processed user data over the data transmission channel established between the first local gateway and the at least one first small base station.

(IV) Switching of the Mobile User Equipment Between Cells in the Local Controller/Local Gateway, and Accompanying Forwarding of Data while Switching Between the Cells When the user equipment is moving between small stations controlled by the first local controller/local gateway, then the user equipment is switched between the cells generally in the following steps:

In the step A1, the user equipment is connected, establishes a normal link with the first local controller, and transmits user data through the first small base station serving the user equipment (which may be a plurality of serving small base stations, i.e., a plurality of first small base stations);

In the step A2, if measurement of the user equipment and/or measurement of the small base station satisfies a report condition, then a measurement result (a link quality measurement result) is reported to the first local controller;

The so-called report condition for measurement generally refers to detection of the qualities of the link between the user equipment and the first small base station, and a link between the user equipment and a small base station adjacent to the first small base station. Generally the report condition can be configured in the form of periodical measurement or an event-triggered report. The periodical measurement refers to a periodical measurement report of the qualities of the link between the user equipment and the first small base station, and the link between the user equipment and the small base station adjacent to the first small base station; and for the event-triggered report, some trigger conditions can be configured, for example, the quality of the link to the first small base station (the serving small base station) remains below a threshold for some length of time, the quality of the link to the adjacent small base station remains above a threshold for some length of time, the difference between the quality of the link to the first small base station, and the quality of the link to the adjacent small base station satisfies a threshold for some length of time, etc., and when the trigger condition is satisfied, then the quality of the link will be further reported.

The measurement result of the user equipment refers to a link quality measurement report measured by the user equipment for the first small base station, and a link quality measurement report of the measuring user equipment for the small base station adjacent to the first small base station;

The measurement result of the small base station refers to a link quality measurement report measured by the first small base station for the user equipment, and a link quality measurement report measured by the small base station adjacent to the first small base station for the user equipment; and In the step A3, the local controller makes a decision about switching the serving small base station, according to the received link quality measurement report (which optionally can further include a general load condition of the small base station adjacent to the first small base station), and if it decides to switch the serving small base station, then the user equipment can be reconfigured as appropriate, so that when configuration information in the first small base station for the user equipment is the same as configuration information in the at least one second small base station, to which the user equipment needs to be switched, for the user equipment, then no signaling can be sent to the user equipment, but the user equipment can simply transmit as it is; and if the configuration information in the at least one second small base station to which the user equipment needs to be switched is not the same as the configuration information in the first small base station, then control signaling including reconfiguration information needs to be sent to the user equipment; and A switching instruction is sent to the first small base station serving the user equipment, so that the first small base station serving the user equipment stops serving the user equipment, and a switching instruction and the reconfiguration information is sent to the second small base station to which the user equipment needs to be switched, so that the second small base station to which the user equipment needs to be switched starts to serve the user equipment, where the reconfiguration information is determined by the first local controller from the configuration information of the user equipment in the second small base station.

For the user equipment, generally the controlling signaling including the reconfiguration information is issued on the first small base station, and Reconfiguration Complete signaling returned by the user equipment is sent on the second small base station.

The configuration information of the first small base station for the user equipment, and the configuration information of the at least one second small base station, to which the user equipment needs to be switched, for the user equipment can include the protocol stack configuration information; and Furthermore the protocol stack of the first small base station is configured so that:

If all of PHY and the higher layers are located in the central node, then after the user equipment is switched to the second small base station, the protocol stack entities of the user equipment doesn't perform any reconfiguration or reset operations after the user equipment is switched to the second small base station;

If PHY is located in the small base station, and MAC and the higher layers are located in the central node, then the PHY layer among the protocol stack entities of the user equipment perform reconfiguration and reset operations, and MAC and the respective higher layers simply operate as they are, after the user equipment is switched to the second small base station;

If PHY and MAC are located in the small base station, and RLC and the higher layers are located in the central node, then the PHY and MAC layers among the protocol stack entities of the user equipment perform reconfiguration and reset operations, and RLC and the respective higher layers simply operate as they are after the user equipment is switched to the second small base station; and If PHY, MAC and RLC are located in the small base station, and PDCP and the higher layers are located in the central node, then the PHY, MAC and RLC layers among the protocol stack entities of the user equipment perform reconfiguration and reset operations, and PDCP and the respective higher layers simply operate as they are after the user equipment is switched to the second small base station If there is reconfiguration signaling of the user equipment as a result of switching, then the network will configure the user equipment explicitly to make a state report of the PDCP layer or the RLC layer, where if only the PDCP layer is located in the central node, and all the remaining RLC and lower layers are located in the small base station, then a state report of the PDCP layer will be triggered, and if the RLC layer is also located in the central node, then a state report of the RLC layer will be triggered.

When the user equipment transmitting the user data is switched from the first small base station to the second small base station hosted by the first local controller and the first local gateway, then the data is forwarded as follows:

In the step B1, the first local controller sends first data forwarding control signaling to the first small base station;

Particularly when the first local controller knows from the protocol stack configuration information of the first small base station that the RLC layer is located in the small base station, there are buffered data at the RLC layer of the small base station, so the first local controller sends the first data forwarding controlling signaling to the first small base station.

In the step B2, after the first small base station receives the first data forwarding control signaling from the first local controller, if there is a direct data channel established between the first small base station and the second small base station, then first forwarded data is forwarded to the second small base station over the direct data channel; and if there is no direct data channel established between the first small base station and the second small base station, then first forwarded data is forwarded to the first local gateway, and the first local gateway forwards the first forwarded data to the second small base station;

Where the first forwarded data are determined by the first small base station according to a transmission mode of the user data; and The first forwarded data include non-transmitted user data buffered in the first small base station, or non-transmitted user data, and transmitted user data for which no acknowledgement message is received, buffered in the first small base station.

The forwarded data are determined in two transmission modes of the user data including an Unacknowledged Mode (UM) and an Acknowledged Mode (AM) as described below respectively:

In the UM mode:

If the RLC layer and the higher layers are located in the central node, then no data needs to be forwarded, and after the lower layers than MAC/PHY of the first small base station are reset, the second small base station receives data again from the first local gateway, and starts to transmit the new data, and If the RLC layer is located in the first small base station, then the non-transmitted data (and optionally the transmitted data for which no positive acknowledgment is received) among the data buffered at the RLC layer is to be forwarded from the first small base station to the second small base station in sequence, and retransmitted; and In the AM mode:

If the RLC layer and the higher layers are located in the central node, then no data needs to be forwarded, and after the lower layers than MAC/PHY of the first small base station are reset, the second small base station receives data again from the first local gateway, and starts to transmit the new data, and If the RLC layer is located in the first small base station, then the non-transmitted data (and optionally the transmitted data for which no positive ARQ acknowledgment is received) among the data buffered at the RLC layer needs to be forwarded from the first small base station to the second small base station in sequence, and retransmitted.

In the step B3, the user equipment starts to operate for transmitting and receiving data normal with the second small base station.

(V) Switching Between Cells Across the Local Controller/Local Gateway, and Accompanying Forwarding of Data while Switching Between Cells Generally the user equipment can have a number of serving small base stations serving it concurrently, but these serving small base stations shall be hosted by the same local controller/local gateway. When the user equipment moves to the edge of the area of some small base station controlled by the local controller/local gateway, then switching across a control area may be considered, that is, the user equipment may be switched from the current local controller to another local controller and the user equipment may be served by a small base station controlled by the another local controller. Generally the user equipment is not allowed to be served by two local controllers due to a complex procedure and interaction, so across-area switching is generally collective switching between sets of serving small base stations, that is, the user equipment is switched from a set 1 of serving small base stations to a set 2 of serving small base stations.

The user equipment is switched between the cells across the local controller/local gateway generally in the following steps:

In the step C1, the user equipment is connected, establishes a normal link with the first local controller, and transmits data through the first small base station serving the user equipment (which may be more than one first small base station);

In the step C2, if measurement of the user equipment (and/or the small base station) satisfies a report condition, then the user equipment (and/or the small base station) report a measurement result to the local controller, where measurement items and the measurement result are substantially the same as in the step A2 in (IV), so a repeated description thereof will be omitted here;

In the step C3, the first local controller receives the measurement result (which optionally can further include a general load condition of a small base station adjacent to the first small base station), and makes a decision about switching the serving small base station, and since the first local controller knows clearly which small base stations are hosted by the first local controller, and which small base stations are hosted by another local controller, if it is determined that the user equipment needs to be switched to and served by a set of small base stations hosted by another local controller (the second local controller), then the flow will proceed to the step C4;

In the step C4, the first local controller currently serving the user equipment sends switching request signaling to the second local controller to notify the second local controller that the user equipment is gonging to be switched thereto, where the switching request signaling carries necessary context information of the user equipment;

Simply the context of the user equipment refers to some characteristics of the user equipment, e.g., some characteristic of an ongoing service, some preference of the user equipment, and configuration on the first small base station, so that the user equipment is switched to the second small base station, and the second local controller determines the configuration information of the user equipment;

In the step C5, the second local controller makes an admission decision according to its resource and load conditions, and if the user equipment can be admitted, then the second local controller sends switching acknowledgement signaling carrying configuration information of the user equipment to the first local controller;

The carried configuration information of the user equipment is new configuration information relative to the configuration information of the user equipment on the first small base station;

In the step C6, the first local controller sends the switching acknowledgement signaling including configuration information to the user equipment through the at least one first small base station, so that the user equipment is switched to the third small base station; and In the step C7, the user equipment is connected with the second local controller, replies with a Configuration Complete message, and starts to transmit and receive signaling on the second set of small base stations; and since the user equipment is switched to the second local controller/local gateway, all the control-plane bearer entities of the user equipment are reset, all the user-plane bearer entities in the UM mode also need to be reset, only the PDCP entity in the AM mode transmits as it is, and all the other entities in the AM mode also need to be reset, so that a necessary PDCP state report is made as configured.

If the user equipment transmitting the user data is switched from the first small base station to the third small base station hosted by the second local controller and the second local gateway, then the data are forwarded as follows:

The first local controller sends second data forwarding control signaling to the first small base station, and after the first small base station receives the second data forwarding control signaling of the first local controller, if there is a direct data channel established between the first small base station and the third small base station, then first forwarded data can be forwarded to the third small base station over the direct data channel; and if there is no direct data channel established between the first small base station and the third small base station, then the first forwarded data can be forwarded to the first local gateway, so that the first local gateway forwards the first forwarded data to the third small base station through the second local gateway; and The first local controller sends third data forwarding control signaling to the first local gateway, the first local gateway forwards second forwarded data to the second local gateway, and the second local gateway forwards the second forwarded data to the third small base station;

Where the second forwarded data are determined by the first local gateway according to a transmission mode of the user data; and The second forwarded data include at least non-transmitted user data buffered in the first local gateway.

Particularly if the transmission mode of the user data is the AM mode, then all the user data, which have not been received correctly by the opposite end, as determined by the first local gateway according to the state information of the PDCP entity can be transmitted to the second local gateway, and all the non-transmitted data, and the data for which no positive ARQ acknowledgement is obtained can also be forwarded to the second local gateway in sequence; and if the transmission mode of the user data is the UM mode, then all the non-transmitted data, and optionally the data for which no positive acknowledgement is obtained can be forwarded to the second local gateway in sequence.

Based upon the same inventive idea, embodiments of the invention further provide a first local controller, a first small base station, and a first local gateway, and since the first local controller, the first small base station, and the first local gateway address the problem under a similar principle to the communication methods above, reference can be made to the implementations of the methods above for implementations of the first local controller, the first small base station, and the first local gateway, and a repeated description thereof will be omitted here.

Figure 7:
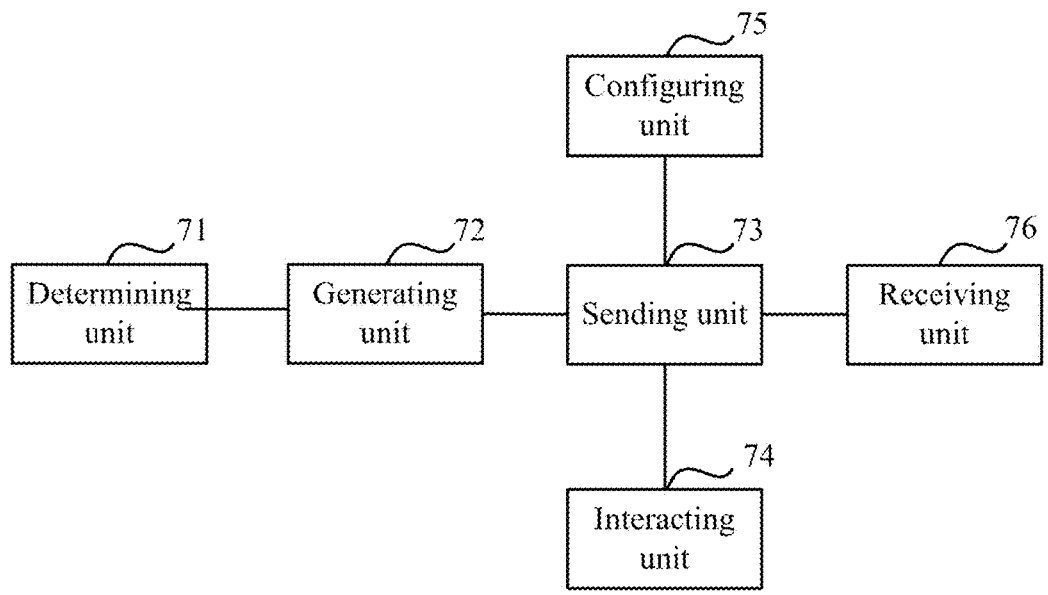
FIG. 7 is a schematic structural diagram of a first local controller in accordance with an embodiment of the invention.

Referring to FIG. 7, it illustrates a first local controller according to an embodiment of the invention, which includes:

A determining unit 71 is configured to determine that there is a user equipment for which a data bearer needs to be established;

A generating unit 72 is configured to generate data bearer configuration information for transmitting the user data; and A sending unit 73 is configured to send the data bearer configuration information to a first local gateway and/or at least one first small base station, so that the network element entity receiving the data bearer configuration information establishes a data transmission channel according to the data bearer configuration information, where the user equipment is hosted by the first local controller and the first local gateway, and the first small base station serves the user equipment.

Preferably the sending unit 73 is further configured to send broadcast channel configuration information to the first small base station, so that the first small base station issues common control signaling according to the broadcast channel configuration information.

Preferably the first local controller further includes:

An interacting unit 74 is configured, when the user equipment residing on a macro base station is switched from an idle state to a connected state, and needs to transmit user data through the first small base station, for the first local controller to interact with the macro base station, and to obtain small base station configuration information for carrying the user data of the user equipment; and The sending unit 73 is further configured to send control signaling including the small base station configuration information to the first small base station, so that the first small base station provides the user equipment with a data transmission service according to the small base station configuration information.

Preferably the first local controller further includes:

A configuring unit 75 is configured to configure the first small base station with protocol stack configuration information according to a network condition, and the performance of a backhaul link between the first small base station and the first local gateway; and The sending unit 73 is configured to send the bearer configuration information to the first local gateway by carrying the protocol stack configuration information configured for the first small base station, in the data bearer configuration information, and sending the data bearer configuration information to the first local gateway, so that the first local gateway processes user data received from the first small base station according to the protocol stack configuration information of the first small base station; to send the bearer configuration information to the first small base station by carrying the protocol stack configuration information configured for the first small base station, in the data bearer configuration information, and sending the data bearer configuration information to the first small base station, so that the first small base station processes user data according to the received protocol stack configuration information;

and to send the bearer configuration information to the first local gateway and the at least one first small base station by carrying the protocol stack configuration information configured for the respective first small base stations, in the data bearer configuration information, and sending the data bearer configuration information to the first local gateway, and carrying the protocol stack configuration information configured for the first small base stations, in the data bearer configuration information, and sending the data bearer configuration information to the first small base stations, so that the first small base stations process user data according to the received protocol stack configuration information, and the first local gateway processes user data received from the first small base stations according to the protocol stack configuration information of the first small base stations; and The protocol stack configuration information is configured in any one of the following modes:

In a first mode, the Physical (PHY) layer, the Media Access Control (MAC) layer, the Radio Link Control (RLC) layer, and the Packet Data Convergence Protocol (PDCP) layer are located in the first local gateway;

In a second mode, PHY is located in the first small base station, and MAC, RLC, and PDCP are located in the first local gateway;

In a third mode, PHY and MAC are located in the first small base station, and RLC, and PDCP are located in the first local gateway; and In a fourth mode, PHY, MAC and RLC are located in the first small base station, and PDCP is located in the first local gateway.

Preferably the first local controller further includes:

A receiving unit 76 is configured to receive a link quality measurement report; and The sending unit 73 is further configured, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment, to send control signaling including reconfiguration information to the user equipment through the at least one first small base station, to send a switching instruction to the first small base station serving the user equipment, so that the first small base station serving the user equipment stops serving the user equipment, and to send a switching instruction and the reconfiguration information to the second small base station to which the user equipment needs to be switched, so that the second small base station to which the user equipment needs to be switched starts to serve the user equipment;

Where the link quality measurement report includes either or both of the following instances:

A first instance includes a link quality measurement report measured by the user equipment for the first small base station, and a link quality measurement report measured by the user equipment for a small base station adjacent to the first small base station, and A second instance includes a link quality measurement report measured by the first small base station for the user equipment, and a link quality measurement report measured by a small base station adjacent to the first small base station for the user equipment; and The reconfiguration information is determined by the first local controller according to the configuration information of the user equipment in the second small base station.

Preferably the first local controller further includes:

A receiving unit 76 is configured to receive a link quality measurement report;

The sending unit 73 is further configured to send switching request signaling to a second local controller upon determining that that the user equipment needs to be switched to at least one third small base station hosted by the second local controller, according to the received link quality measurement report;

The receiving unit 76 is further configured to receive switching acknowledgment signaling, including configuration information configured for the user equipment, sent by the second local controller; and The sending unit 73 is further configured to send the received switching acknowledgment signaling including the configuration configured for the user equipment to the user equipment through the at least one first small base station; and Where the link quality measurement report includes either or both of the following instances:

A first instance includes a link quality measurement report measured by the user equipment for the first small base station, and a link quality measurement report measured by the user equipment for a small base station adjacent to the first small base station, and A second instance includes a link quality measurement report measured by the first small base station for the user equipment, and a link quality measurement report measured by a small base station adjacent to the first small base station for the user equipment.

Preferably the sending unit 73 is further configured, when the user equipment transmitting the user data is switched from the first small base station to a second small base station hosted by the first local controller and the first local gateway, to send first data forwarding control signaling to the first small base station, so that when there is no direct data channel established between the first small base station and the second small base station, to forward first forwarded data to the first local gateway, so that the first local gateway forwards the first forwarded data to the second small base station, and when there is a direct data channel established between the first small base station and the second small base station, to forward first forwarded data to the second small base station over the direct data channel; and when the user equipment transmitting the user data is switched from the first small base station to a third small base station hosted by a second local controller and a second local gateway, to send second data forwarding control signaling to the first small base station, so that when there is no direct data channel established between the first small base station and the third small base station, to forward first forwarded data to the first local gateway, so that the first local gateway forwards the first forwarded data to the third small base station through the second local gateway, and when there is a direct data channel established between the first small base station and the third small base station, to forward first forwarded data to the third small base station over the direct data channel; where the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

Preferably the sending unit 73 is further configured, when the user equipment transmitting the user data is switched from the first small base station to a third small base station hosted by a second local controller and a second local gateway, to send third data forwarding control signaling to the first local gateway, so that the first local gateway forwards second forwarded data to the second local gateway, and the second local gateway forwards the second forwarded data to the third small base station;

Where the second forwarded data are determined by the first local gateway according to a transmission mode of the user data; and The second forwarded data include at least non-transmitted user data buffered in the first local gateway.

Figure 8:
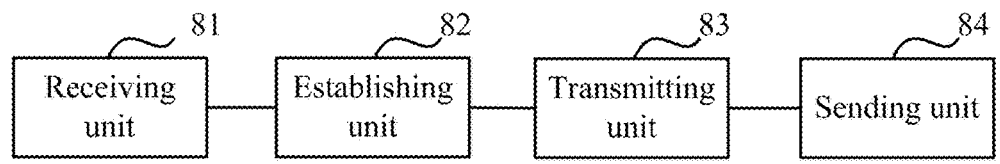
FIG. 8 is a schematic structural diagram of a first small base station in accordance with an embodiment of the invention.

Referring to FIG. 8, it illustrates a first small base station according to an embodiment of the invention, which is hosted by a first local controller, and which includes:

A receiving unit 81 is configured to receive data bearer configuration information for transmitting user data, from the first local controller;

An establishing unit 82 is configured to establish a data transmission channel according to the received data bearer configuration information; and A transmitting unit 83 is configured to transmit the user data over the established data transmission channel.

Preferably the first small base station is hosted by a first local gateway; and

The establishing unit 82 is configured to establish a data transmission channel with the Internet upon determining that user data are to be transmitted directly over the Internet, according to the received data bearer configuration information; to establish a data transmission channel with the first local gateway upon determining that the first local gateway participates in transmission of user data, according to the received data bearer configuration information.

Preferably the receiving unit 81 is further configured to receive broadcast channel configuration information sent by the first local controller; and The first small base station further includes:

A sending unit 84 is configured to issue common control signaling according to the broadcast channel configuration information, so that the user equipment covered by the first small base station resides on the first small base station according to the common control signaling.

Preferably the receiving unit 81 is further configured to receive control signaling, including small base station configuration information, sent by the first local controller, and to provide the user equipment with a data transmission service according to the small base station configuration information, where the small base station configuration information is obtained by the first local controller as a result of interacting with a macro base station; and the user equipment is located in an intersection of a coverage area by the macro base station, and a coverage area by the first small base station, and resides on the macro base station when the user equipment is idle.

Preferably the data bearer configuration information includes protocol stack configuration information of the first small base station.

The receiving unit 81 is further configured to process the user data according to the received protocol stack configuration information before the transmitting unit transmits the user data over the established data transmission channel; and The transmitting unit 83 is configured to transmit the processed user data over the data transmission channel established between the first small base station and the first local gateway;

Where the protocol stack configuration information of the first small base station is configured for the first small base station by the first local controller according to a network condition, and the performance of a backhaul link between the first small base station and the first local gateway; and The protocol stack configuration information is configured in any one of the following modes:

In a first mode, the Physical (PHY) layer, the Media Access Control (MAC) layer, the Radio Link Control (RLC) layer, and the Packet Data Convergence Protocol (PDCP) layer are located in the first local gateway;

In a second mode, PHY is located in the first small base station, and MAC, RLC, and PDCP are located in the first local gateway;

In a third mode, PHY and MAC are located in the first small base station, and RLC, and PDCP are located in the first local gateway; and In a fourth mode, PHY, MAC and RLC are located in the first small base station, and PDCP is located in the first local gateway.

Preferably the first small base station further includes:

A sending unit 84 is configured to send a link quality measurement report to the first local controller; and The receiving unit 81 is further configured to receive controlling signaling including reconfiguration information, and a switching instruction, from the first local controller; and to send the received control signaling including the reconfiguration information to the user equipment, so that the user equipment is switched to a second small base station; and the first small base station stops serving the user equipment, according to the switching instruction, where the control signaling including the reconfiguration information, and the switching instruction is issued by the first local controller, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment.

Where the link quality measurement report includes either or both of the following instances:

A first instance includes a link quality measurement report measured by the user equipment for the first small base station, and a link quality measurement report measured by the user equipment for a small base station adjacent to the first small base station, and A second instance includes a link quality measurement report measured by the first small base station for the user equipment, and a link quality measurement report measured by a small base station adjacent to the first small base station for the user equipment; and The reconfiguration information is determined by the first local controller according to configuration information of the user equipment in a third small base station.

Preferably the first small base station further includes:

A sending unit 84 is configured to send a link quality measurement report to the first local controller;

The receiving unit 81 is further configured to receive switching acknowledgement signaling, including configuration information configured for the user equipment, from a second local controller through the first local controller;

The sending unit 84 is further configured to send the received switching acknowledgement signaling including the reconfiguration information to the user equipment, so that the user equipment is switched to a third small base station; and The first small base station stops serving the user equipment, according to the switching acknowledgement signaling;

Where the switching acknowledgement signaling is sent by the second local controller upon reception of a switching request of the first local controller to switch the user equipment to at least one third small base station hosted by the second local controller, and the third small base station is hosted by the second local controller;

Where the link quality measurement report includes either or both of the following instances:

A first instance includes a link quality measurement report measured by the user equipment for the first small base station, and a link quality measurement report measured by the user equipment for a small base station adjacent to the first small base station, and A second instance includes a link quality measurement report measured by the first small base station for the user equipment, and a link quality measurement report measured by a small base station adjacent to the first small base station for the user equipment.

Preferably the first small base station further includes a data forwarding unit (not illustrated) configured, when the user equipment transmitting the user data is switched from the first small base station to a second small base station hosted by the first local controller and a first local gateway, after the receiving unit receives first data forwarding control signaling of the first local controller, when there is a direct data channel established between the first small base station and the second small base station, to forward first forwarded data to the second small base station over the direct data channel; and when there is no direct data channel established between the first small base station and the second small base station, to forward first forwarded data to the first local gateway, so that the first local gateway forwards the first forwarded data to the second small base station; and When the user equipment transmitting the user data is switched from the first small base station to a third small base station hosted by a second local controller and a second local gateway, after the receiving unit receives second data forwarding control signaling of the first local controller, when there is a direct data channel established between the first small base station and the third small base station, to forward first forwarded data to the third small base station over the direct data channel; and when there is no direct data channel established between the first small base station and the third small base station, to forward the first forwarded data to the first local gateway, so that the first local gateway forwards the first forwarded data to the third small base station through the second local gateway;

Where the first forwarded data are determined by the first small base station according to a transmission mode of the user data; and The first forwarded data include non-transmitted user data buffered in the first small base station, or non-transmitted user data, and transmitted user data for which no acknowledgement message is received, buffered in the first small base station.

Figure 9:
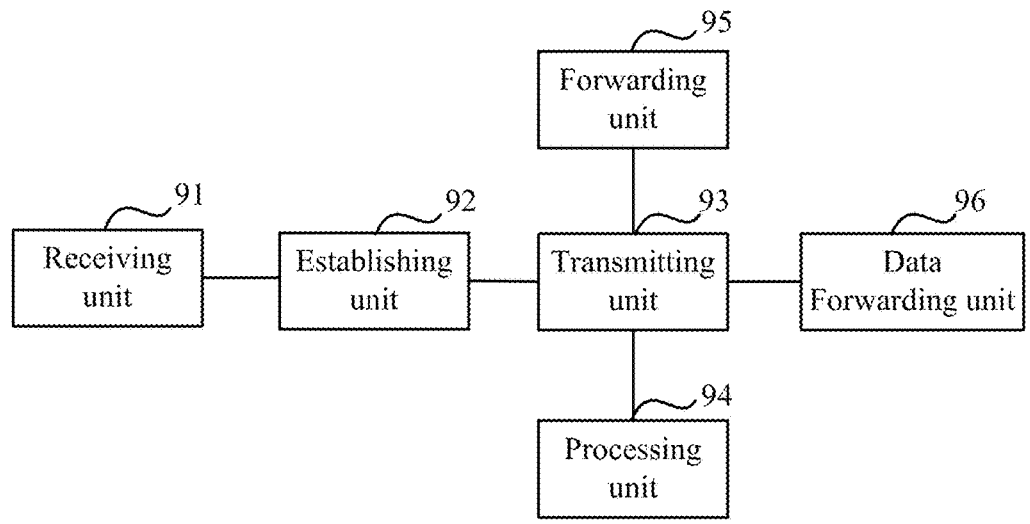
FIG. 9 is a schematic structural diagram of a first local gateway in accordance with an embodiment of the invention.

Referring to FIG. 9, it illustrates a first local gateway according to an embodiment of the invention, which includes:

A receiving unit 91 is configured to receive data bearer configuration information for transmitting user data, from a first local controller;

An establishing unit 92 is configured to establish a data transmission channel according to the received data bearer configuration information; and A transmitting unit 93 is configured to transmit the user data over the established data transmission channel.

Preferably the establishing unit 92 is configured to determine at least one first small base station to participate in transmission of user data, according to the received data bearer configuration information; and to establish the data transmission channel with the determined at least one first small base station;

Where the first small base station is hosted by the first local gateway and the first local controller.

Preferably the establishing unit 92 is further configured to establish a data transmission channel with the Internet upon determining that user data are to be transmitted directly over the Internet, according to the received data bearer configuration information; to establish a data transmission channel with a core network upon determining that the core network participates in transmission of user data, according to the received data bearer configuration information; to establish a data transmission channel with at least one second small base station upon determining that the at least one second small base station participates in transmission of user data, according to the received data bearer configuration information; to establish a data transmission channel with a second local gateway upon determining that the second local gateway participates in transmission of user data, according to the received data bearer configuration information, so that the first local gateway transmits user equipment of a first user equipment to a second user equipment through the second local gateway, and receives user data, transmitted by the second user equipment to the first user equipment, through the second local gateway;

Where the second small base station is hosted by the first local gateway and the first local controller, the first user equipment is hosted by the first local gateway, and the second user equipment is hosted by the second local gateway.

Preferably the data bearer configuration information includes protocol stack configuration information of the respective first small base stations; and the first local gateway further includes:

A processing unit 94 is configured to process the user data according to the protocol stack configuration information of the first small base station before the transmitting unit transmits the user data over the established data transmission channel, and after the user data of the first small base station is received; and The transmitting unit 93 is configured to transmit the processed user data over the data transmission channel established with the at least one first small base station;

Where the protocol stack configuration information of the first small base station is configured for the first small base station by the first local controller according to a network condition, and the performance of a backhaul link between the first small base station and the first local gateway; and The protocol stack configuration information is configured in any one of the following modes:

In a first mode, the Physical (PHY) layer, the Media Access Control (MAC) layer, the Radio Link Control (RLC) layer, and the Packet Data Convergence Protocol (PDCP) layer are located in the first local gateway;

In a second mode, PHY is located in the first small base station, and MAC, RLC, and PDCP are located in the first local gateway;

In a third mode, PHY and MAC are located in the first small base station, and RLC, and PDCP are located in the first local gateway; and In a fourth mode, PHY, MAC and RLC are located in the first small base station, and PDCP is located in the first local gateway.

Preferably the first local gateway further includes:

A forwarding unit 95 is configured, when the user equipment transmitting the user data is switched from the first small base station to a second small base station hosted by the first local controller and the first local gateway, to forward first forwarded data forwarded by the first small base station to the second small base station; and when the user equipment transmitting the user data is switched from the first small base station to a third small base station hosted by a second local controller and a second local gateway, to forward first forwarded data forwarded by the first small base station to the second local gateway, so that the second local gateway sends the received first forwarded data to the third small base station; where the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

Preferably the receiving unit 91 is further configured, if the user equipment transmitting the user data is switched from the first small base station to a third small base station hosted by a second local controller and a second local gateway, to receive third data forwarded control signaling from the first local controller; and The first local gateway further includes:

A data forwarding unit 96 is configured to forward second forwarded data to the second local gateway, so that the second local gateway sends the received second forwarded data to the third small base station, where the second forwarded data are determined by the first local gateway according to a transmission mode of the user data; and the second forwarded data includes at least non-transmitted user data buffered in the first local gateway.

Figure 10:
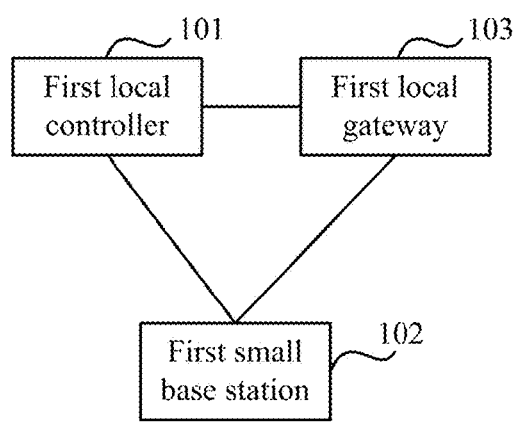
FIG. 10 is a schematic structural diagram of a communication system in accordance with an embodiment of the invention.

Referring to FIG. 10, it illustrates a communication system according to an embodiment of the invention, which includes a first local controller 101, a first small base station 102, and a first local gateway 103, where:

The first local controller 101 is configured to determine that there is a user equipment for which a data bearer needs to be established; to generate data bearer configuration information for transmitting the user data; and to send the data bearer configuration information to the first local gateway and/or at least one first small base station, where the user equipment is hosted by the first local controller and the first local gateway, and the first small base station serves the user equipment;

The first small base station 102 is configured to receive the data bearer configuration information for transmitting user data, from the first local controller; to establish a data transmission channel according to the received data bearer configuration information; and to transmit the user data over the established data transmission channel; where the first small base station is hosted by the first local controller and the first local gateway; and The first local gateway 103 is configured to receive the data bearer configuration information for transmitting user data, from the first local controller; to establish a data transmission channel according to the received data bearer configuration information; and to transmit the user data over the established data transmission channel.

Figure 11:
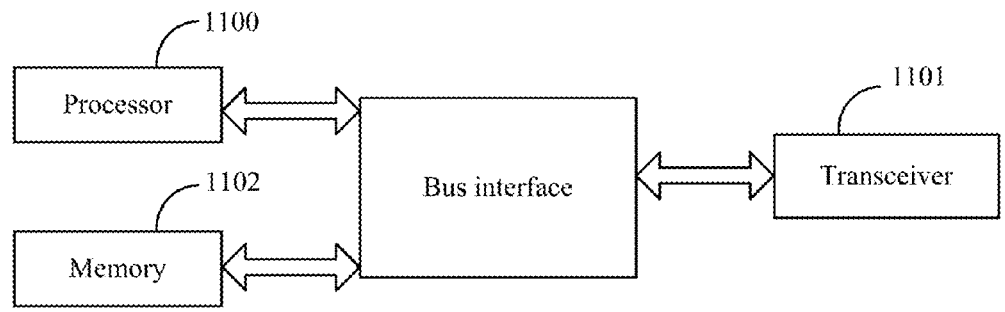
FIG. 11 is a schematic structural diagram of another first local controller in accordance with an embodiment of the invention.

Referring to FIG. 11, it illustrates a schematic structural diagram of another first local controller according to an embodiment of the invention, which includes a processor 1100, a transceiver 1101, and a memory 1102, all of which communicate with each other via a bus interface, where:

The processor 1100 is configured to read program in the memory 1102, and to further perform the processes of:

Determining that there is a user equipment for which a data bearer needs to be established; generating data bearer configuration information for transmitting the user data; and sending the data bearer configuration information to a first local gateway and/or at least one first small base station through the transceiver 1101, so that the network element entity receiving the data bearer configuration information establishes a data transmission channel according to the data bearer configuration information, where the user equipment is hosted by the first local controller and the first local gateway, and the first small base station serves the user equipment; and The transceiver 1101 is configured to be controlled by the processor 1100 to transmit and receive data.

Preferably the processor 1100 is configured to read the program in the memory 1102, and to further perform the process of:

Sending broadcast channel configuration information to the first small base station through the transceiver 1101, so that the first small base station issues common control signaling according to the broadcast channel configuration information.

Preferably the processor 1100 is configured to read the program in the memory 1102, and to further perform the processes of:

When the user equipment residing on a macro base station is switched from an idle state to a connected state, and needs to transmit user data through the first small base station, then interacting with the macro base station through the transceiver 1101, and obtaining small base station configuration information for carrying the user data of the user equipment; and sending control signaling including the small base station configuration information to the first small base station through the transceiver 1101, so that the first small base station provides the user equipment with a data transmission service according to the small base station configuration information.

Preferably the processor 1100 is configured to read the program in the memory 1102, and to further perform the processes of:

Configuring the first small base station with protocol stack configuration information according to a network condition, and the performance of a backhaul link between the first small base station and the first local gateway, and carrying the protocol stack configuration information configured for the first small base station, in the data bearer configuration information, and sending the data bearer configuration information to the first local gateway through the transceiver 1101, so that the first local gateway processes user data received from the first small base station according to the protocol stack configuration information of the first small base station; carrying the protocol stack configuration information configured for the first small base station, in the data bearer configuration information, and sending the data bearer configuration information to the first small base station through the transceiver 1101, so that the first small base station processes user data according to the received protocol stack configuration information; and carrying the protocol stack configuration information configured for the respective first small base stations, in the data bearer configuration information, and sending the data bearer configuration information to the first local gateway through the transceiver 1101; carrying the protocol stack configuration information configured for the first small base stations, in the data bearer configuration information, and sending the data bearer configuration information to the first small base station through the transceiver 1101, so that the first small base stations process user data according to the received protocol stack configuration information, and the first local gateway processes user data received from the first small base stations according to the protocol stack configuration information of the first small base stations; where the protocol stack configuration information is configured in any one of the following modes: in a first mode, the Physical (PHY) layer, the Media Access Control (MAC) layer, the Radio Link Control (RLC) layer, and the Packet Data Convergence Protocol (PDCP) layer are located in the first local gateway; in a second mode, PHY is located in the first small base station, and MAC, RLC, and PDCP are located in the first local gateway; in a third mode, PHY and MAC are located in the first small base station, and RLC, and PDCP are located in the first local gateway; and in a fourth mode, PHY, MAC and RLC are located in the first small base station, and PDCP is located in the first local gateway.

Preferably the processor 1100 is configured to read the program in the memory 1102, and to further perform the processes of:

Receiving a link quality measurement report through the transceiver 1101; and upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment, then sending control signaling including reconfiguration information to the user equipment through the at least one first small base station through the transceiver 1101, sending a switching instruction to the first small base station serving the user equipment through the transceiver 1101, so that the first small base station serving the user equipment stops serving the user equipment, and sending a switching instruction and the reconfiguration information to the second small base station to which the user equipment needs to be switched, so that the second small base station to which the user equipment needs to be switched starts to serve the user equipment; where the link quality measurement report includes either or both of the following instances: a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment; and the reconfiguration information is determined by the first local controller according to the configuration information of the user equipment in the second small base station.

Preferably the processor 1100 is configured to read the program in the memory 1102, and to further perform the processes of:

Receiving a link quality measurement report through the transceiver 1101; sending switching request signaling to a second local controller through the transceiver 1101 upon determining that that the user equipment needs to be switched to at least one third small base station hosted by the second local controller, according to the received link quality measurement report; receiving switching acknowledgment signaling, including configuration information configured for the user equipment, sent by the second local controller, through the transceiver 1101; and sending the received switching acknowledgment signaling including the configuration information configured for the user equipment to the user equipment through the at least one first small base station; where the link quality measurement report includes either or both of the following instances: a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment.

Preferably the processor 1100 is configured to read the program in the memory 1102, and to further perform the processes of:

If the user equipment transmitting the user data is switched from the first small base station to a second small base station hosted by the first local controller and the first local gateway, then sending first data forwarding control signaling to the first small base station through the transceiver 1101, so that if there is no direct data channel established between the first small base station and the second small base station, then forwarding first forwarded data to the first local gateway, so that the first local gateway forwards the first forwarded data to the second small base station, and if there is a direct data channel established between the first small base station and the second small base station, then forwarding first forwarded data to the second small base station over the direct data channel; and if the user equipment transmitting the user data is switched from the first small base station to a third small base station hosted by a second local controller and a second local gateway, then sending second data forwarding control signaling to the first small base station through the transceiver 1101, so that if there is no direct data channel established between the first small base station and the third small base station, then forwarding first forwarded data to the first local gateway, so that the first local gateway forwards the first forwarded data to the third small base station through the second local gateway, and if there is a direct data channel established between the first small base station and the third small base station, then forwarding first forwarded data to the third small base station over the direct data channel;

Where the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

Preferably the processor 1100 is configured to read the program in the memory 1102, and to further perform the processes of:

When the user equipment transmitting the user data is switched from the first small base station to a third small base station hosted by a second local controller and a second local gateway, then sending third data forwarding control signaling to the first local gateway through the transceiver 1101, so that the first local gateway forwards second forwarded data to the second local gateway, and the second local gateway forwards the second forwarded data to the third small base station; where the second forwarded data are determined by the first local gateway according to a transmission mode of the user data; and the second forwarded data include at least non-transmitted user data buffered in the first local gateway.

Here in FIG. 11, the bus architecture can include any number of interconnected buses and bridges and particularly link together one or more processors represented by the processor 1100, and a memory represented by the memory 1102. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 1101 can include a number of elements including a transmitter and a receiver serving as elements configured to communicate with various other devices over a transmission medium. The processor 1100 is responsible for managing the bus architecture and performing other normal processes, and the memory 1102 can store data for use by the processor 1100 in performing the operations.

Figure 12:
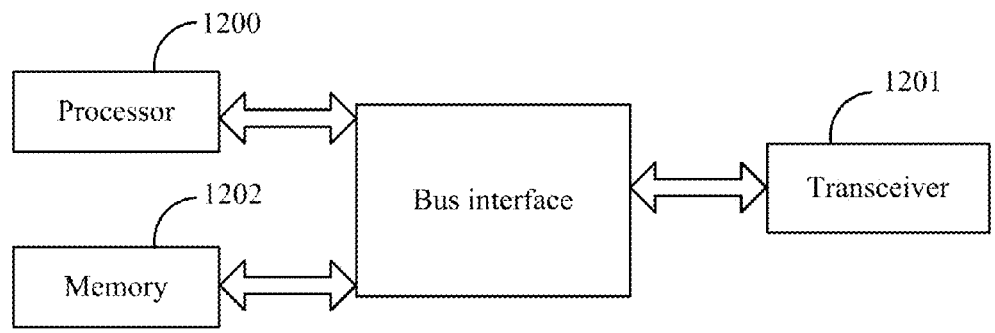
FIG. 12 is a schematic structural diagram of another first small base station in accordance with an embodiment of the invention.

Referring to FIG. 12, it illustrates a schematic structural diagram of another first small base station according to an embodiment of the invention, which includes a processor 1200, a transceiver 1201, and a memory 1202, all of which communicate with each other via a bus interface, where:

The processor 1200 is configured to read program in the memory 1202, and to further perform the processes of:

Receiving data bearer configuration information for transmitting user data, from a first local controller through the transceiver 1201; establishing a data transmission channel according to the received data bearer configuration information; and transmitting the user data over the established data transmission channel; where the first small base station is hosted by the first local controller; and The transceiver 1201 is configured to be controlled by the processor 1200 to transmit and receive data.

Preferably the processor 1200 is configured to read the program in the memory 1202, and to further perform the process of:

Establishing a data transmission channel with the Internet upon determining that user data are to be transmitted directly over the Internet, according to the received data bearer configuration information; establishing a data transmission channel with a first local gateway upon determining that the first local gateway participates in transmission of user data, according to the received data bearer configuration information; where the first small base station is hosted by the first local gateway.

Preferably the processor 1200 is configured to read the program in the memory 1202, and to further perform the process of:

Receiving broadcast channel configuration information sent by the first local controller through the transceiver 1201; and issuing common control signaling according to the broadcast channel configuration information, so that the user equipment covered by the first small base station resides on the first small base station according to the common control signaling.

Preferably the processor 1200 is configured to read the program in the memory 1202, and to further perform the process of:

Receiving control signaling, including small base station configuration information, sent by the first local controller, through the transceiver 1201, where the small base station configuration information is obtained by the first local controller as a result of interacting with a macro base station; and providing the user equipment with a data transmission service according to the small base station configuration information, where the user equipment is located in an intersection of a coverage area by the macro base station, and a coverage area by the first small base station, and resides on the macro base station when the user equipment is idle.

Preferably the data bearer configuration information includes protocol stack configuration information of the first small base station; and the processor 1200 is configured to read the program in the memory 1202, and to further perform the process of:

Before transmitting the user data over the established data transmission channel, processing the user data according to the protocol stack configuration information received through the transceiver 1201; and transmitting the processed user data over the data transmission channel established with the first local gateway; where the protocol stack configuration information of the first small base station is configured for the first small base station by the first local controller according to a network condition, and the performance of a backhaul link between the first small base station and the first local gateway; and the protocol stack configuration information is configured in any one of the following modes: in a first mode, the Physical (PHY) layer, the Media Access Control (MAC) layer, the Radio Link Control (RLC) layer, and the Packet Data Convergence Protocol (PDCP) layer are located in the first local gateway; in a second mode, PHY is located in the first small base station, and MAC, RLC, and PDCP are located in the first local gateway; in a third mode, PHY and MAC are located in the first small base station, and RLC, and PDCP are located in the first local gateway; and in a fourth mode, PHY, MAC and RLC are located in the first small base station, and PDCP is located in the first local gateway.

Preferably the data bearer configuration information includes protocol stack configuration information of the first small base station; and the processor 1200 is configured to read the program in the memory 1202, and to further perform the process of:

Sending a link quality measurement report to the first local controller through the transceiver 1201; receiving controlling signaling including reconfiguration information, and a switching instruction, from the first local controller through the transceiver 1201; and sending the received control signaling including the reconfiguration information to the user equipment, so that the user equipment is switched to a second small base station; and the first small base station stops serving the user equipment, according to the switching instruction, where the control signaling including the reconfiguration information, and the switching instruction is issued by the first local controller, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment; where the link quality measurement report includes either or both of the following instances: a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment; and the reconfiguration information is determined by the first local controller according to configuration information of the user equipment in a third small base station.

Preferably the data bearer configuration information includes protocol stack configuration information of the first small base station; and the processor 1200 is configured to read the program in the memory 1202, and to further perform the process of:

Sending a link quality measurement report to the first local controller through the transceiver 1201; receiving switching acknowledgement signaling, including configuration information configured for the user equipment, from a second local controller through the first local controller; sending the received switching acknowledgement signaling including the reconfiguration information to the user equipment through the transceiver 1201, so that the user equipment is switched to a third small base station; and stopping serving the user equipment, according to the switching acknowledgement signaling; where the switching acknowledgement signaling is sent by the second local controller upon reception of a switching request of the first local controller to switch the user equipment to at least one third small base station hosted by the second local controller, and the third small base station is hosted by the second local controller; and the link quality measurement report includes either or both of the following instances: a first instance includes a link quality measurement report measured by the user equipment for the first small base station, and a link quality measurement report measured by the user equipment for a small base station adjacent to the first small base station, and a second instance includes a link quality measurement report measured by the first small base station for the user equipment, and a link quality measurement report measured by a small base station adjacent to the first small base station for the user equipment.

Preferably the data bearer configuration information includes protocol stack configuration information of the first small base station; and the processor 1200 is configured to read the program in the memory 1202, and to further perform the process of:

If the user equipment transmitting the user data is switched from the first small base station to a second small base station hosted by the first local controller and a first local gateway, after receiving first data forwarding control signaling of the first local controller through the transceiver 1201, if there is a direct data channel established between the first small base station and the second small base station, then forwarding first forwarded data to the second small base station over the direct data channel; and if there is no direct data channel established between the first small base station and the second small base station, then forwarding first forwarded data to the first local gateway through the transceiver 1201, so that the first local gateway forwards the first forwarded data to the second small base station; and if the user equipment transmitting the user data is switched from the first small base station to a third small base station hosted by a second local controller and a second local gateway, after receiving second data forwarding control signaling of the first local controller through the transceiver 1201, if there is a direct data channel established between the first small base station and the third small base station, then forwarding first forwarded data to the third small base station over the direct data channel; and if there is no direct data channel established between the first small base station and the third small base station, then forward the first forwarded data to the first local gateway through the transceiver 1201, so that the first local gateway forwards the first forwarded data to the third small base station through the second local gateway; where the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

Here in FIG. 12, the bus architecture can include any number of interconnected buses and bridges and particularly link together one or more processors represented by the processor 1200, and a memory represented by the memory 1202. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 1201 can include a number of elements including a transmitter and a receiver serving as elements configured to communicate with various other devices over a transmission medium. The processor 1200 is responsible for managing the bus architecture and performing other normal processes, and the memory 1202 can store data for use by the processor 1200 in performing the operations.

Figure 13:
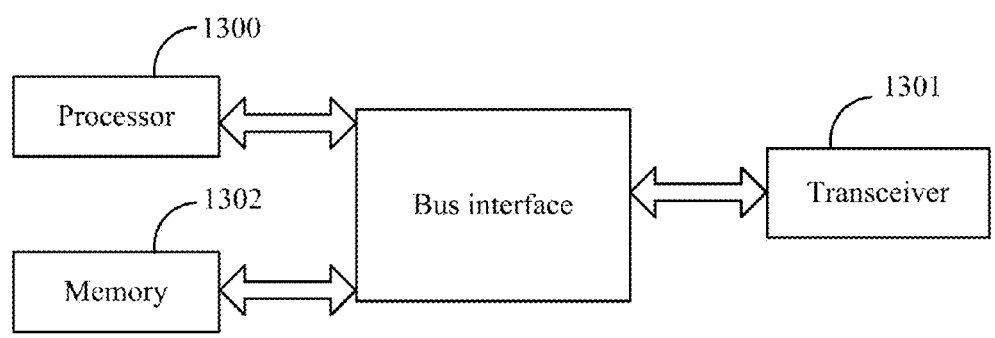
FIG. 13 is a schematic structural diagram of another first local gateway in accordance with an embodiment of the invention.

Referring to FIG. 13, it illustrates a schematic structural diagram of another first local gateway according to an embodiment of the invention, which includes a processor 1300, a transceiver 1301, and a memory 1302, all of which communicate with each other via a bus interface, where:

The processor 1300 is configured to read program in the memory 1302, and to further perform the processes of:

Receiving data bearer configuration information for transmitting user data, from a first local controller through the transceiver 1301; establishing a data transmission channel according to the received data bearer configuration information; and transmitting the user data over the established data transmission channel; and The transceiver 1301 is configured to be controlled by the processor 1300 to transmit and receive data.

Preferably the processor 1300 is configured to read the program in the memory 1302, and to further perform the process of:

Determining at least one first small base station to participate in transmission of user data, according to the received data bearer configuration information; and establishing the data transmission channel with the determined at least one first small base station; where the first small base station is hosted by the first local gateway and the first local controller.

Preferably the processor 1300 is configured to read the program in the memory 1302, and to further perform the processes of:

Establishing a data transmission channel with the Internet upon determining that user data are to be transmitted directly over the Internet, according to the received data bearer configuration information; establishing a data transmission channel with a core network upon determining that the core network participates in transmission of user data, according to the received data bearer configuration information; establishing a data transmission channel with at least one second small base station upon determining that the at least one second small base station participates in transmission of user data, according to the received data bearer configuration information; establishing a data transmission channel with a second local gateway upon determining that the second local gateway participates in transmission of user data, according to the received data bearer configuration information, so that the first local gateway transmits user equipment of a first user equipment to a second user equipment through the second local gateway, and receives user data, transmitted by the second user equipment to the first user equipment, through the second local gateway; where the second small base station is hosted by the first local gateway and the first local controller, the first user equipment is hosted by the first local gateway, and the second user equipment is hosted by the second local gateway.

Preferably the data bearer configuration information includes protocol stack configuration information of the respective first small base stations; and the processor 1300 is configured to read the program in the memory 1302, and to further perform the processes of:

Before transmitting the user data over the established data transmission channel, and after receiving the user data of the first small base station through the transceiver 1301, processing the user data according to the protocol stack configuration information of the first small base station; and transmitting the processed user data over the data transmission channel established with the at least one first small base station; where the protocol stack configuration information of the first small base station is configured for the first small base station by the first local controller according to a network condition, and the performance of a backhaul link between the first small base station and the first local gateway; and the protocol stack configuration information is configured in any one of the following modes: in a first mode, the Physical (PHY) layer, the Media Access Control (MAC) layer, the Radio Link Control (RLC) layer, and the Packet Data Convergence Protocol (PDCP) layer are located in the first local gateway; in a second mode, PHY is located in the first small base station, and MAC, RLC, and PDCP are located in the first local gateway; in a third mode, PHY and MAC are located in the first small base station, and RLC, and PDCP are located in the first local gateway; and in a fourth mode, PHY, MAC and RLC are located in the first small base station, and PDCP is located in the first local gateway.

Preferably the data bearer configuration information includes protocol stack configuration information of the respective first small base stations; and the processor 1300 is configured to read the program in the memory 1302, and to further perform the processes of:

When the user equipment transmitting the user data is switched from the first small base station to a second small base station hosted by the first local controller and the first local gateway, then forwarding first forwarded data forwarded by the first small base station to the second small base station through the transceiver 1301; and when the user equipment transmitting the user data is switched from the first small base station to a third small base station hosted by a second local controller and a second local gateway, then forwarding first forwarded data forwarded by the first small base station to the second local gateway through the transceiver 1301, so that the second local gateway sends the received first forwarded data to the third small base station; where the first forwarded data are determined by the first small base station according to a transmission mode of the user data; and the first forwarded data include non-transmitted user data buffered in the first small base station, or non-transmitted user data, and transmitted user data for which no acknowledgement message is received, buffered in the first small base station.

Preferably the processor 1300 is configured to read the program in the memory 1302, and to further perform the processes of:

When the user equipment transmitting the user data is switched from the first small base station to a third small base station hosted by a second local controller and a second local gateway, then receiving third data forwarded control signaling from the first local controller through the transceiver 1301; and forwarding second forwarded data to the second local gateway through the transceiver 1301, so that the second local gateway sends the received second forwarded data to the third small base station, where the second forwarded data are determined by the first local gateway according to a transmission mode of the user data; and the second forwarded data includes at least non-transmitted user data buffered in the first local gateway.

Here in FIG. 13, the bus architecture can include any number of interconnected buses and bridges and particularly link together one or more processors represented by the processor 1300, and a memory represented by the memory 1302. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 1301 can include a number of elements including a transmitter and a receiver serving as elements configured to communicate with various other devices over a transmission medium. The processor 1300 is responsible for managing the bus architecture and performing other normal processes, and the memory 1302 can store data for use by the processor 1300 in performing the operations.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A communication method, comprising:
   determining, by a first local controller, that there is a user equipment for which a data bearer needs to be established;
   generating, by the first local controller, data bearer configuration information for transmitting the user data; and
   sending, by the first local controller, the data bearer configuration information to a first local gateway and/or at least one first small base station, so that a network element entity receiving the data bearer configuration information establishes a data transmission channel according to the data bearer configuration information, wherein the user equipment is hosted by the first local controller and the first local gateway, and the first small base station serves the user equipment;
   the method further comprising: configuring, by the first local controller, the first small base station with protocol stack configuration information according to a network condition, and a performance of a backhaul link between the first small base station and the first local gateway; and
   sending, by the first local controller, the data bearer configuration information to the first local gateway comprises:
   carrying, by the first local controller, the protocol stack configuration information configured for the first small base station, in the data bearer configuration information, and sending the data bearer configuration information to the first local gateway, so that the first local gateway processes user data received from the first small base station according to the protocol stack configuration information of the first small base station; or
   sending, by the first local controller, the data bearer configuration information to the at least one first small base station comprises:
   carrying, by the first local controller, the protocol stack configuration information configured for the first small base station, in the data bearer configuration information, and sending the data bearer configuration information to the first small base station, so that the first small base station processes user data according to the received protocol stack configuration information; or
   sending, by the first local controller, the data bearer configuration information to the first local gateway and the at least one first small base station comprises:
   carrying, by the first local controller, the protocol stack configuration information configured for the respective first small base stations, in the data bearer configuration information, and sending the data bearer configuration information to the first local gateway, and carrying the protocol stack configuration information configured for the first small base stations, in the data bearer configuration information, and sending the data bearer configuration information to the first small base station, so that the first small base stations process user data according to the received protocol stack configuration information, and the first local gateway processes user data received from the first small base stations according to the protocol stack configuration information of the first small base stations;
   wherein the protocol stack configuration information is configured in any one of the following modes:
   in a first mode, a Physical (PHY) layer, a Media Access Control (MAC) layer, a Radio Link Control (RLC) layer, and a Packet Data Convergence Protocol (PDCP) layer are located in the first local gateway;
   in a second mode, the PHY layer is located in the first small base station, and MAC, RLC, and PDCP layers are located in the first local gateway;
   in a third mode, the PHY and MAC layers are located in the first small base station, and RLC, and PDCP layers are located in the first local gateway; and
   in a fourth mode, the PHY, MAC and RLC layers are located in the first small base station, and the PDCP layer is located in the first local gateway.

2. The method according to claim 1, further comprising:
sending, by the first local controller, broadcast channel configuration information to the first small base station, so that the first small base station issues common control signaling according to the broadcast channel configuration information.

3. The method according to claim 1, further comprising:
when the user equipment residing on a macro base station is switched from an idle state to a connected state, and needs to transmit user data through the first small base station, then interacting, by the first local controller, with the macro base station, and obtaining small base station configuration information for carrying the user data of the user equipment; and
sending, by the first local controller, control signaling comprising the small base station configuration information to the first small base station, so that the first small base station provides the user equipment with a data transmission service according to the small base station configuration information.

4. The method according to claim 1, further comprising:
receiving, by the first local controller, a link quality measurement report; and
upon determining, by the first local controller, that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment, then sending control signaling comprising reconfiguration information to the user equipment through the at least one first small base station; and
sending a switching instruction to the first small base station serving the user equipment, so that the first small base station serving the user equipment stops serving the user equipment, and sending a switching instruction and the reconfiguration information to the second small base station to which the user equipment needs to be switched, so that the second small base station to which the user equipment needs to be switched starts to serve the user equipment;
wherein the link quality measurement report comprises either or both of the following instances:
a first instance comprises a link quality measurement report measured by user equipment for the first small base station, and a link quality measurement report measured by user equipment for a small base station adjacent to the first small base station, and
a second instance comprises a link quality measurement report measured by first small base station for the user equipment, and a link quality measurement report measured by a small base station adjacent to the first small base station for the user equipment; and
the reconfiguration information is determined by the first local controller according to the configuration information of the user equipment in the second small base station.

5. The method according to claim 1, further comprising:
receiving, by the first local controller, a link quality measurement report;
sending, by the first local controller, switching request signaling to a second local controller upon determining that that the user equipment needs to be switched to at least one third small base station hosted by the second local controller, according to the received link quality measurement report;
receiving, by the first local controller, switching acknowledgment signaling, comprising configuration information configured for the user equipment, sent by the second local controller; and
sending, by the first local controller, the received switching acknowledgment signaling comprising the configuration information configured for the user equipment to the user equipment through the at least one first small base station;
wherein the link quality measurement report comprises either or both of the following instances:
a first instance comprises a link quality measurement report measured by the user equipment for the first small base station, and a link quality measurement report measured by the user equipment for a small base station adjacent to the first small base station, and
a second instance comprises a link quality measurement report measured by the first small base station for the user equipment, and a link quality measurement measured by a small base station adjacent to the first small base station for the user equipment.

6. The method according to claim 1, wherein when the user equipment transmitting the user data is switched from the first small base station to a second small base station hosted by the first local controller and the first local gateway, then the method further comprises:
sending, by the first local controller, first data forwarding control signaling to the first small base station, so that when there is no direct data channel established between the first small base station and the second small base station, then forwarding first forwarded data to the first local gateway, so that the first local gateway forwards the first forwarded data to the second small base station, and when there is a direct data channel established between the first small base station and the second small base station, then forwarding first forwarded data to the second small base station over the direct data channel; or
when the user equipment transmitting the user data is switched from the first small base station to a third small base station hosted by a second local controller and a second local gateway, then the method further comprises:
sending, by the first local controller, second data forwarding control signaling to the first small base station, so that when there is no direct data channel established between the first small base station and the third small base station, then forwarding first forwarded data to the first local gateway, so that the first local gateway forwards the first forwarded data to the third small base station through the second local gateway, and when there is a direct data channel established between the first small base station and the third small base station, then forwarding first forwarded data to the third small base station over the direct data channel;
wherein the first forwarded data are determined by the first small base station according to a transmission mode of the user data; and
the first forwarded data comprise non-transmitted user data buffered in the first small base station, or non-transmitted user data, and transmitted user data for which no acknowledgement message is received, buffered in the first small base station.

7. The method according to claim 1, wherein when the user equipment transmitting the user data is switched from the first small base station to a third small base station hosted by a second local controller and a second local gateway, then the method further comprises:
sending, by the first local controller, third data forwarding control signaling to the first local gateway, so that the first local gateway forwards second forwarded data to the second local gateway, and the second local gateway forwards the second forwarded data to the third small base station;

wherein the second forwarded data are determined by the first local gateway according to a transmission mode of the user data; and the second forwarded data comprise at least non-transmitted user data buffered in the first local gateway.

8. A communication method, comprising:

receiving, by a first small base station, data bearer configuration information for transmitting user data, from a first local controller;

establishing, by the first small base station, a data transmission channel with the Internet upon determining that user data are to be transmitted directly over the Internet, according to the received data bearer configuration information;

establishing, by the first small base station, a data transmission channel with a first local gateway upon determining that the first local gateway participates in transmission of user data, according to the received data bearer configuration information; and transmitting, by the first small base station, the user data over the established data transmission channel;

wherein the first small base station is hosted by the first local controller; the first small base station is hosted by the first local gateway; the data bearer configuration information comprises protocol stack configuration information of the first small base station; and before the first small base station transmits the user data over the established data transmission channel, the method further comprises:

processing, by the first small base station, the user data according to the received protocol stack configuration information; and transmitting, by the first small base station, the user data over the established data transmission channel comprises:

transmitting, by the first small base station, the processed user data over the data transmission channel established between the first small base station and the first local gateway;

wherein the protocol stack configuration information of the first small base station is configured for the first small base station by the first local controller according to a network condition, and a performance of a backhaul link between the first small base station and the first local gateway; and the protocol stack configuration information is configured in any one of the following modes:

in a first mode, a Physical (PHY) layer, a Media Access Control (MAC) layer, a Radio Link Control (RLC) layer, and a Packet Data Convergence Protocol (PDCP) layer are located in the first local gateway;

in a second mode, the PHY layer is located in the first small base station, and the MAC, RLC, and PDCP layers are located in the first local gateway;

in a third mode, the PHY and MAC layers are located in the first small base station, and the RLC, and PDCP layers are located in the first local gateway; and in a fourth mode, the PHY, MAC and RLC layers are located in the first small base station, and the PDCP layer is located in the first local gateway.

9. The method according to claim 8, further comprising:

receiving, by the first small base station, broadcast channel configuration information sent by the first local controller; and issuing, by the first small base station, common control signaling according to the broadcast channel configuration information, so that a user equipment with a data transmission service according to the small base station configuration information, wherein the user equipment is located in an intersection of a coverage area by the macro base station, and a coverage area by the first small base station, and resides on the macro base station when the user equipment is idle.

10. The method according to claim 8, further comprising:

receiving, by the first small base station, control signaling, comprising small base station configuration information, sent by the first local controller, wherein the small base station configuration information is obtained by the first local controller as a result of interacting with a macro base station; and providing, by the first small base station, a user equipment with a data transmission service according to the small base station configuration information, wherein the user equipment is located in an intersection of a coverage area by the macro base station, and a coverage area by the first small base station, and resides on the macro base station when the user equipment is idle.

11. The method according to claim 8, further comprising:

sending, by the first small base station, a link quality measurement report to the first local controller;

receiving, by the first small base station, controlling signaling comprising reconfiguration information, and a switching instruction, from the first local controller;

sending, by the first small base station, the received control signaling comprising the reconfiguration information to a user equipment, so that the user equipment is switched to a second small base station; and stopping, by the first small base station, serving the user equipment, according to the switching instruction;

wherein the control signaling comprising the reconfiguration information, and the switching instruction is issued by the first local controller, upon determining that the user equipment needs to be switched to at least one second small base station hosted by the first local controller, according to the received link quality measurement report, when the configuration information in the first small base station for the user equipment is not the same as configuration information in the at least one second small base station, to which the user equipment needs to be switched, for the user equipment;

the link quality measurement report comprises either or both of the following instances:

a first instance comprises a link quality measurement report measured by the user equipment for the first small base station, and a link quality measurement report measured by the user equipment for a small base station adjacent to the first small base station, and a second instance comprises a link quality measurement report measured by the first small base station for the user equipment, and a link quality measurement report measured by a small base station adjacent to the first small base station for the user equipment; and the reconfiguration information is determined by the first local controller according to configuration information of the user equipment in a third small base station.

12. The method according to claim 8, further comprising:

sending, by the first small base station, a link quality measurement report to the first local controller;

receiving, by the first small base station, switching acknowledgement signaling, comprising configuration information configured for a user equipment, from a second local controller through the first local controller;

sending, by the first small base station, the received switching acknowledgement signaling comprising the reconfiguration information to the user equipment, so that the user equipment is switched to a third small base station; and stopping, by the first small base station, serving the user equipment, according to the switching acknowledgement signaling;

wherein the switching acknowledgement signaling is sent by the second local controller upon reception of a switching request of the first local controller to switch the user equipment to at least one third small base station, and the third small base station is hosted by the second local controller; and the link quality measurement report comprises either or both of the following instances:

a first instance comprises a link quality measurement report measured by the user equipment for the first small base station, and a link quality measurement report measured by the user equipment for a small base station adjacent to the first small base station, and a second instance comprises a link quality measurement report measured by the first small base station for the user equipment, and a link quality measurement report measured by a small base station adjacent to the first small base station for the user equipment.

13. The method according to claim 8, wherein when a user equipment transmitting the user data is switched from the first small base station to a second small base station hosted by the first local controller and a first local gateway, then the method further comprises:

after the first small base station receives first data forwarding control signaling of the first local controller, when there is a direct data channel established between the first small base station and the second small base station, then forwarding first forwarded data to the second small base station over the direct data channel; and when there is no direct data channel established between the first small base station and the second small base station, then forwarding first forwarded data to the first local gateway, so that the first local gateway forwards the first forwarded data to the second small base station;

when the user equipment transmitting the user data is switched from the first small base station to a third small base station hosted by a second local controller and a second local gateway, then the method further comprises:

after the first small base station receives second data forwarding control signaling of the first local controller, when there is a direct data channel established between the first small base station and the third small base station, then forwarding first forwarded data to the third small base station over the direct data channel; and when there is no direct data channel established between the first small base station and the third small base station, then forwarding the first forwarded data to the first local gateway, so that the first local gateway forwards the first forwarded data to the third small base station through the second local gateway;

wherein the first forwarded data are determined by the first small base station according to a transmission mode of the user data; and the first forwarded data comprise non-transmitted user data buffered in the first small base station, or non-transmitted user data, and transmitted user data for which no acknowledgement message is received, buffered in the first small base station.

14. A communication method, comprising:

receiving, by a first local gateway, data bearer configuration information for transmitting user data, from a first local controller;

establishing, by the first local gateway, a data transmission channel according to the received data bearer configuration information; and transmitting, by the first local gateway, the user data over the established data transmission channel;

wherein establishing, by the first local gateway, the data transmission channel according to the received data bearer configuration information comprises:

determining, by the first local gateway, at least one first small base station to participate in transmission of user data, according to the received data bearer configuration information; and establishing, by the first local gateway, the data transmission channel with the determined at least one first small base station;

wherein the first small base station is hosted by the first local gateway and the first local controller; and establishing, by the first local gateway, a data transmission channel with the Internet upon determining that user data are to be transmitted directly over the Internet, according to the received data bearer configuration information;

establishing, by the first local gateway, a data transmission channel with a core network upon determining that the core network participates in transmission of user data, according to the received data bearer configuration information;

establishing, by the first local gateway, a data transmission channel with at least one second small base station upon determining that the at least one second small base station participates in transmission of user data, according to the received data bearer configuration information;

establishing, by the first local gateway, a data transmission channel with a second local gateway upon determining that the second local gateway participates in transmission of user data, according to the received data bearer configuration information, so that the first local gateway transmits user data of a first user equipment to a second user equipment through the second local gateway, and receives user data, transmitted from the second user equipment to the first user equipment, through the second local gateway;

wherein the second small base station is hosted by the first local gateway and the first local controller, the first user equipment is hosted by the first local gateway, and the second user equipment is hosted by the second local gateway.

15. The method according to claim 14, wherein the data bearer configuration information comprises protocol stack configuration information of the respective first small base stations; and before the first local gateway transmits the user data over the established data transmission channel, the method further comprises:

processing the user data according to the protocol stack configuration information of the first small base station upon reception of the user data of the first small base station; and transmitting, by the first local gateway, the user data over the established data transmission channel comprises:

transmitting, by the first local gateway, the processed user data over the data transmission channel established between the first local gateway and the at least one first small base station;

wherein the protocol stack configuration information of the first small base station is configured for the first small base station by the first local controller according to a network condition, and a performance of a backhaul link between the first small base station and the first local gateway; and the protocol stack configuration information is configured in any one of the following modes:

in a first mode, the Physical (PHY) layer, the Media Access Control (MAC) layer, the Radio Link Control (RLC) layer, and the Packet Data Convergence Protocol (PDCP) layer are located in the first local gateway;

in a second mode, PHY layer is located in the first small base station, and MAC, RLC, and PDCP are located in the first local gateway;

in a third mode, PHY and MAC layers are located in the first small base station, and RLC, and PDCP are located in the first local gateway; and in a fourth mode, PHY, MAC and RLC layers are located in the first small base station, and PDCP layer is located in the first local gateway.

16. The method according to claim 14, wherein when the user equipment transmitting the user data is switched from the first small base station to a second small base station hosted by the first local controller and the first local gateway, then the method further comprises:

forwarding, by the first local gateway, first forwarded data forwarded by the first small base station to the second small base station; and when the user equipment transmitting the user data is switched from the first small base station to a third small base station hosted by a second local controller and a second local gateway, then the method further comprises:

forwarding, by the first local gateway, first forwarded data forwarded by the first small base station to the second local gateway, so that the second local gateway sends the received first forwarded data to the third small base station;

wherein the first forwarded data are determined by the first small base station according to a transmission mode of the user data; and the first forwarded data comprise non-transmitted user data buffered in the first small base station, or non-transmitted user data, and transmitted user data for which no acknowledgement message is received, buffered in the first small base station.

17. The method according to claim 14, wherein when the user equipment transmitting the user data is switched from the first small base station to a third small base station hosted by a second local controller and a second local gateway, then the method further comprises:

receiving, by the first local gateway, third data forwarded control signaling from the first local controller; and forwarding, by the first local gateway, second forwarded data to the second local gateway, so that the second local gateway sends the received second forwarded data to the third small base station;

wherein the second forwarded data are determined by the first local gateway according to a transmission mode of the user data; and the second forwarded data comprises at least non-transmitted user data buffered in the first local gateway.

* * * * *